(12) United States Patent
Kamata et al.

(10) Patent No.: US 7,848,342 B2
(45) Date of Patent: *Dec. 7, 2010

(54) MULTICAST ACCOUNTING CONTROL SYSTEM AND BROADBAND ACCESS SERVER

(75) Inventors: Masanori Kamata, Yokohama (JP); Kengo Ijima, Yokohama (JP); Hiroaki Miyata, Yokohama (JP); Ken Oouchi, Yokohama (JP); Takatoshi Kajiwara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 12/326,116

(22) Filed: Dec. 2, 2008

(65) Prior Publication Data

US 2009/0080427 A1 Mar. 26, 2009

Related U.S. Application Data

(63) Continuation of application No. 11/189,739, filed on Jul. 27, 2005, now Pat. No. 7,474,669.

(30) Foreign Application Priority Data

Nov. 24, 2004 (JP) .............................. 2004-338683

(51) Int. Cl.
*H04J 3/26* (2006.01)
(52) U.S. Cl. ...................... 370/432; 370/312; 709/201; 709/227
(58) Field of Classification Search ................ 370/312, 370/390, 432, 400–403; 709/200, 203, 227–209
See application file for complete search history.

(56) References Cited

U.S. PATENT DOCUMENTS

| | | | | |
|---|---|---|---|---|
| 6,567,851 | B1 * | 5/2003 | Kobayashi | 709/228 |
| 6,658,463 | B1 * | 12/2003 | Dillon et al. | 709/219 |
| 6,970,913 | B1 * | 11/2005 | Albert et al. | 709/217 |
| 7,054,902 | B2 * | 5/2006 | Toporek et al. | 709/203 |
| 2006/0109795 | A1 | 5/2006 | Kamata et al. | |

FOREIGN PATENT DOCUMENTS

| | | |
|---|---|---|
| JP | 2000349818 | 12/2000 |
| JP | 2003037627 | 2/2003 |
| JP | 2003264577 | 9/2003 |
| JP | 2003333580 | 11/2003 |
| JP | 2004127121 | 4/2004 |
| JP | 2004166053 | 6/2004 |
| JP | 2004235954 | 8/2004 |
| JP | 2004282161 | 10/2004 |
| WO | 02052469 | 7/2002 |

* cited by examiner

Primary Examiner—Phuc Tran
(74) Attorney, Agent, or Firm—Brundidge & Stanger, P.C.

(57) ABSTRACT

A listening-or-viewing charge is differentiated with bit rates depending on distributed programs. A broadband access server for holding user channels by PPP and replicating and transferring multicast packets have a counter for counting the number of distributed multicast packets and the number of distributed bytes at each multicast group address. The counter values (byte counts and packet counts) when a user joins a multicast group and when the user leaves the multicast group and a multicast session ID containing a PPP user ID and a multicast group address are sent to a multicast accounting radius server. The multicast accounting server provides an accounting on a basis of the byte counts, the packet counts, or a bit rate.

20 Claims, 25 Drawing Sheets

FIG. 3A

| PPPoE Session ID (20151) | PPP User ID (20152) |
| --- | --- |
| 1 | user1@isp1 |
| 2 | user2@isp2 |
| 3 | - |
| ⋮ | ⋮ |

FIG. 3B

| PPPoE Session ID | PPP User ID |
| --- | --- |
| 1 | user1@isp1 |
| 2 | user2@isp2 |
| 3 | user3@isp1 |
| ⋮ | ⋮ |

| PPP User ID | MULTICAST GROUP ADDRESS | Multicast Session ID |
|---|---|---|
| user1@isp1 | 224.10.10.10 | user1@isp1_4# 224.10.10.10 |
| user2@isp2 | 224.10.10.10 | user2@isp2_4# 224.10.10.10 |
| user3@isp1 | 224.30.30.30 | - |
| user4@isp2 | - | - |
| ⋮ | ⋮ | ⋮ |

FIG. 4A

| PPP User ID | MULTICAST GROUP ADDRESS | Multicast Session ID |
|---|---|---|
| user1@isp1 | 224.10.10.10 | user1@isp1_4# 224.10.10.10 |
| user2@isp2 | 224.10.10.10 | user2@isp2_4# 224.10.10.10 |
| user3@isp1 | 224.30.30.30 | user3@isp1_4# 224.30.30.30 |
| user4@isp2 | - | - |
| ⋮ | ⋮ | ⋮ |

FIG. 4B

| MULTICAST GROUP ADDRESS (20171) | PPPoE Session ID (20172) |
|---|---|
| 224. 10. 10. 10 | 1 |
| 224. 10. 10. 10 | 2 |
| 224. 30. 30. 30 | 3 |
| ⋮ | ⋮ |

FIG.5

| MULTICAST GROUP ADDRESS | MULTICAST ACCOUNTING RADIUS SERVER ADDRESS | CDN |
|---|---|---|
| 224. 10. 10. 10 | 20. 1. 1. 1 | CDN1 |
| 224. 30. 30. 30 | 40. 1. 1. 1 | CDN2 |
| . | . | . |
| . | . | . |
| . | . | . |

FIG. 6

| Code | Identifier | Length |
|---|---|---|
| Authenticator ||||
| Attribute |||

| ATTRIBUTE-NAME | Acct-MC-Start | Acct-MC-Stop |
|---|---|---|
| user-name | O | O |
| nas-ip-address | O | O |
| nas-port | O | O |
| service-type | O | O |
| framed-protocol | O | O |
| vendor-specific | O | O |
| nas-identifier | O | O |
| acct-status-type | O | O |
| acct-delay-time | O | O |
| acct-input-octets | O | O |
| acct-session-id | O | O |
| acct-authentic | O | O |
| acct-session-time | — | O |
| acct-input-packets | O | O |
| acct-terminate-cause | — | O |
| acct-input-gigawords | O | O |
| event-timestamp | O | O |
| nas-port-type | O | O |

5005 → acct-status-type
5002 → acct-input-octets
5001 → acct-session-id
5003 → acct-input-packets
5004 → acct-input-gigawords

FIG. 19

| Multicast Session ID | PPP User ID | MC GROUP ADDRESS | Acct Status Type | Session Time (min) | BYTES | PACKETS |
| --- | --- | --- | --- | --- | --- | --- |
| User2@isp1_4# 224.10.10.10 | User2@ isp1 | 224.10.10.10 | Start | 4 | 128 | 25 |
| User2@isp1_4# 224.10.10.10 | User2@ isp1 | 224.10.10.10 | Stop | 180 | 512 | 68 |
| user3@isp1_4# 224.30.30.30 | user3@ isp1 | 224.30.30.30 | Start | 10 | 200 | 50 |
| user3@isp1_4# 224.30.30.30 | user3@ isp1 | 224.30.30.30 | Stop | 250 | 355 | 88 |
| . . . | . . . | . . . | . . . | . . . | . . . | . . . |

Columns labeled: 60001, 60002, 60003, 60004, 60005, 60006, 60007

FIG. 20

| MC GROUP ADDRESS (20141) | PPP User ID (20144) | BYTES (20142) | PACKETS (20143) |
|---|---|---|---|
| 224.10.10.10 | user1@isp1 | 100 | 10 |
| 224.30.30.30 | user3@isp1 | 200 | 50 |
| . | . | . | . |
| . | . | . | . |
| . | . | . | . |

FIG. 22A

| MC GROUP ADDRESS | PPP User ID | BYTES | PACKETS |
|---|---|---|---|
| 224.10.10.10 | user1@isp1 | 122 | 25 |
| 224.30.30.30 | user3@isp1 | 355 | 88 |
| . | . | . | . |
| . | . | . | . |
| . | . | . | . |

FIG. 22B

| 20191 | 20192 | 20193 | 20194 | 20195 | 20196 |
|---|---|---|---|---|---|
| MC GROUP ADDRESS | Measurement Time | Join Users | Leave Users | Total Users | Continuation Users |
| 224.30.30.30 | 12:00 – 12:59 | 10 | 5 | 10 | 5 |
| | 13:00 – 13:59 | 20 | 0 | 25 | 25 |
| | 14:00 – 14:59 | 10 | 15 | 35 | 20 |
| | . | . | . | . | . |
| | . | . | . | . | . |
| | . | . | . | . | . |
| | | | | | |

MULTICAST ACCOUNTING CONTROL SYSTEM AND BROADBAND ACCESS SERVER

The present application is a continuation of application Ser. No. 11/189,739, filed Jul. 27, 2005, now U.S. Pat. No. 7,474,669, the contents of which are incorporated herein by reference.

BACKGROUND OF THE INVENTION

1. Field of the Invention

The present invention relates to multicast accounting control systems and broadband access servers, and more specifically, to a multicast accounting control system and a broadband access server for providing a usage-based accounting of multicasting in multicast distribution.

2. Description of the Related Art

It has been studied to charge each user for a multicast distribution service on an as-used basis.

An accounting server which references an authentication log of a multicast authentication server and charges each multicast user by the amount of distribution time is disclosed (for example, see Japanese Unexamined Patent Application Publication No. 2003-333580).

The conventional technique allows each user to be charged by the amount of multicast distribution time, but the listening-or-viewing charge is not differentiated with bit rates depending on distributed programs.

A content management server dynamically selects an accounting server, and the accounting server collects accounting generation information of multicast users and charges each user on an as-used basis is disclosed (for example, see Japanese Unexamined Patent Application Publication No. 2004-127121). For the accounting server, the user must take the trouble of sending the accounting generation information. The accounting generation information used for the conventional usage-based accounting method could be tampered by the user.

An apparatus which creates transmission accounting information of a terminal sending or receiving a content on the basis of information accumulated in a multicast transmission apparatus, such as a reception date and time, a sender IP address, a receiver IP address, and a packet size is disclosed (for example, see Japanese Unexamined Patent Application Publication No. 2003-37627). The apparatus accumulates the packet size of each content, but if different reception terminals join or leave a multicast group at different timings, it would be difficult to charge each reception terminal by the number of distributed bytes, the number of distributed packets, and others.

A content accounting system which charges a user by the data size, resolution, output method, and others when the user performs an operation such as downloading or outputting a content is disclosed (for example, see International Application Publication Pamphlet No. 2002/052469). The content accounting system holds content charges based on a content size, a resolution, and others, but the collection of content size and the accounting are not disclosed in detail.

SUMMARY OF THE INVENTION

Accordingly, it is an object of the present invention to provide a multicast accounting control system and a broadband access server for charging each user by the number of distributed bytes, the number of distributed packets, and the size of distributed data per distribution time, in order to differentiate the charge by the bit rate of the distributed packet. Another object of the present invention is to provide a multicast accounting control system and a broadband access server that save the multicast user from having to send accounting generation information for usage-based accounting.

A further object of the present invention is to charge each user by the number of distributed packets, the number of distributed bytes, and the amount of distribution time, without using any accounting generation information provided by the user, by providing a counter for counting distributed multicast packets or bytes in a broadband access server and referencing and collecting counter values when each user joins or leaves a multicast group. A still another object of the present invention is to provide a usage-based accounting for each user and each multicast program, by collecting accounting generation information concerning each multicast session ID, containing a point-to-point protocol (PPP) user ID and a multicast group address corresponding to a multicast program. A still further object of the present invention is to allow a broadband access server to provide a usage-based accounting in accordance with the number of distributed packets, the number of distributed bytes, and the amount of distribution time of each user or each multicast program, through the use of the counter values and the multicast session ID.

It is another object of the present invention to enable a broadband access server to measure an audience rating of each multicast group corresponding to a multicast program by totalizing the number of users joining the multicast group and the number of users leaving the group through the use of the data mentioned above. It is also an object of the present invention to manage accounting information of each user and of each multicast program collectively, without using any accounting generation information provided by the user, by using the broadband access server to collect the accounting generation information of each multicast session ID and using the multicast accounting server to totalize and store the accounting generation information of each multicast session ID and to provide a usage-based accounting.

According to the present invention, a counter for counting distributed multicast packets and distributed bytes of each user and each multicast group is provided in a broadband access server for holding, concentrating, and managing user channels by PPP and for replicating and transferring multicast packets. A counter value of the broadband access server is referenced and totalized when a multicast user joins or leaves a multicast group.

The broadband access server collects and totalizes the accounting generation information (the number of bytes, the number of packets, and others) of each multicast session ID, which contains a PPP user ID and a multicast group address corresponding to a multicast program. The broadband access server sends the accounting generation information to a multicast accounting server, which totalizes and stores the accounting generation information of each multicast session ID and provides a usage-based accounting of each user and each multicast program.

According to a first solving means of the present invention, there is provided a broadband access server for replicating a multicast packet from a content server, distributing the replicated packet to terminals, and sending accounting information to an accounting server for providing an accounting, the broadband access server comprising:

a communication processing block for communicating with the accounting server;

a counter for counting either or both of the number of bytes and the number of packets of a distributed content at each multicast group address; and a user management table for storing a multicast session identifier containing a user identifier and a multicast group address, in correspondence with the user identifier, wherein the broadband access server establishes a session with a terminal;

when a message requesting membership in a multicast group is received through the established session, the message containing a user identifier and a desired multicast group address, the broadband access server (a) stores a multicast session identifier based on the received user identifier and the multicast group address, in correspondence with the received user identifier in the user management table;

(b) obtains either or both of the number of bytes and the number of packets corresponding to the received multicast group address from the counter; and (c) sends a message requesting the start of multicast accounting through the communication processing block to the accounting server corresponding to the multicast group address, the message containing either or both of the number of bytes and the number of packets and the multicast session identifier; and when a fact that the terminal leaves the multicast group is detected, the broadband access server (d) obtains a multicast session identifier corresponding to the user identifier of the leaved terminal from the user management table;

(e) obtains either or both of the number of bytes and the number of packets corresponding to the multicast group address related to the leaved terminal, from the counter; and (f) sends a message requesting the stop of multicast accounting through the communication processing block to the accounting server corresponding to the multicast group address, the message containing either or both of the number of bytes and the number of packets and the multicast session identifier which are obtained, to let the accounting server obtain either or both of the number of distributed bytes and the number of distributed packets from when the terminal joins the multicast group until when the terminal leaves the multicast group, and charge each user and each multicast group by either or both of the number of distributed bytes and the number of distributed packets, or, a charge each user and each multicast group by a bit rate depending on either or both of the number of distributed bytes and the number of distributed packets.

According to a second solving means of the present invention, there is provided a broadband access server for replicating a multicast packet from a content server, distributing the replicated packet to terminals, and sending accounting information to an accounting server for providing an accounting, the broadband access server comprising:

a communication processing block for communicating with the accounting server;

a counter for counting either or both of the number of bytes and the number of packets of a distributed content, for each multicast session identifier containing a user identifier and a multicast group address; and a user management table for storing the user identifier and the multicast session identifier in correspondence with each other, wherein the broadband access server establishes a session with a terminal;

when a message requesting membership in a multicast group is received through the established session, the message containing the user identifier and a desired multicast group address, the broadband access server (a) stores a multicast session identifier based on the received user identifier and the multicast group address in correspondence with the received user identifier in the user management table; and (b) clears either or both of the number of bytes and the number of packets corresponding to the multicast session identifier of the counter, and starts counting of either or both of the number of distributed bytes and the number of distributed packets; and when a fact that the terminal leaves the multicast group is detected, the broadband access server (c) obtains a multicast session identifier corresponding to the user identifier of the leaved terminal from the user management table;

(d) stops the counting of either or both of the number of bytes and the number of packets corresponding to the obtained multicast session identifier by the counter, and obtains either or both of the number of bytes and the number of packets; and (e) obtains accounting information in accordance with either or both of the number of bytes and the number of packets or in accordance with a bit rate depending on either or both of the number of bytes and the number of packets, and sends the accounting information and the multicast session identifier through the communication processing block to the accounting server corresponding to the multicast group address.

According to a third solving means of the present invention, there is provided a multicast accounting control system comprising:

a broadband access server for replicating a multicast packet from a content server, distributing the replicated packet to terminals, and sending accounting information; and an accounting server for providing an accounting based on the accounting information from the broadband access server, the broadband access server comprising:

a communication processing block for communicating with the accounting server;

a counter for counting either or both of the number of bytes or the number of packets of a distributed content at each multicast group address; and a user management table for storing a multicast session identifier containing a user identifier and a multicast group address in correspondence with the user identifier, wherein the broadband access server establishing a session with a terminal;

when a message requesting membership in a multicast group is received through the established session, the message containing a user identifier and a desired multicast group address, the broadband access server (a) storing a multicast session identifier based on the received user identifier and the multicast group address in correspondence with the received user identifier in the user management table, (b) obtaining either or both of the number of bytes and the number of packets corresponding to the received multicast group address from the counter, and (c) sending a message requesting the start of multicast accounting through the communication processing block to the accounting server corresponding to the multicast group address, the message containing either or both of the number of bytes and the number of packets and the multicast session identifier; and when a fact that the terminal leaves the multicast group is detected, the broadband access server (d) obtaining a multicast session identifier corresponding to the user identifier of the leaved terminal from the user management table, (e) obtaining either or both of the number of bytes and the number of packets corresponding to the multicast group address in accordance with the leaved terminal from the counter, and (f) sending a message requesting the stop of multicast accounting through the communication processing block to the accounting server corresponding to the multicast group address, the message containing either or both of the number of packets and the number of bytes and the multicast session identifier; and the accounting server obtaining either or both of the number of distributed bytes and the number of distributed packets from when the terminal joins the multicast group until when the terminal leaves the multicast group, from either or both of the number of bytes and the number of packets contained in the message requesting the stop of multicast accounting and either or both of the number of bytes and the number of packets contained in the message requesting the start of multicast accounting, and charging each user and each multicast group by either or both of the number of distributed bytes and the number of distributed packets or charging each user and each multicast group by a bit rate corresponding to either or both of the number of distributed bytes and the number of distributed packets.

The present invention provides a multicast accounting control system and a broadband access server for charging each user by the number of distributed bytes, the number of distributed packets, and the size of distributed data per distribution time, so that the listening-or-viewing charge can be differentiated with bit rates of distributed packets. The present invention can also provide a multicast accounting control system and a broadband access server that save the multicast user from having to send accounting generation information for usage-based accounting.

A broadband access server according to the present invention incorporates a counter for counting distributed multicast packets and distributed bytes, and references and totalizes a counter value each time a user joins or leaves a multicast group, so that a usage-based accounting can be provided in accordance with the number of distributed multicast packets, the number of distributed bytes, and the amount of distribution time of each user, without using any accounting generation information provided by the user.

A usage-based accounting of each user and each multicast program can be provided by collecting accounting generation information of each multicast session ID, containing a PPP user ID and a multicast group address corresponding to a multicast program. With the counter values and the multicast session ID, the broadband access server can provide a usage-based accounting in accordance with the number of distributed packets, the number of distributed bytes, and the amount of distribution time of each user or each multicast program.

A broadband access server can totalize the audience rating of the multicast group corresponding to each multicast program, by totalizing the number of users joining the multicast group and the number of users leaving the multicast group, with the aid of the data mentioned above. The broadband access server collects the accounting generation information of each multicast session ID, and the multicast accounting server totalizes and stores the accounting generation information of each multicast session ID and provides a usage-based accounting, so that the accounting information of each user and of each multicast program can be managed collectively, without using the accounting generation information provided by the user.

The present invention can be applied to industries related to multicast distribution.

BRIEF DESCRIPTION OF THE DRAWINGS

FIG. 3A and FIG. 3B show the configuration of a PPPoE session management table of the present invention.

FIG. 4A and FIG. 4B show the configuration of a PPP user management table of the present invention.

FIG. 5 shows the configuration of a multicast group management table of the present invention.

FIG. 6 shows the configuration of an accounting server assignment table of the first embodiment and a third embodiment.

FIG. 18 shows the format of a radius accounting packet.

FIG. 19 shows an attribute of the present invention.

FIG. 20 shows the configuration of a usage-based accounting table of the present invention.

FIG. 22A and FIG. 22B show the configuration of a multicast counter of the second embodiment.

FIG. 24 shows the configuration of an audience rating totalization table of the third embodiment.

DESCRIPTION OF THE PREFERRED EMBODIMENTS

1. First Embodiment

Figure 1:
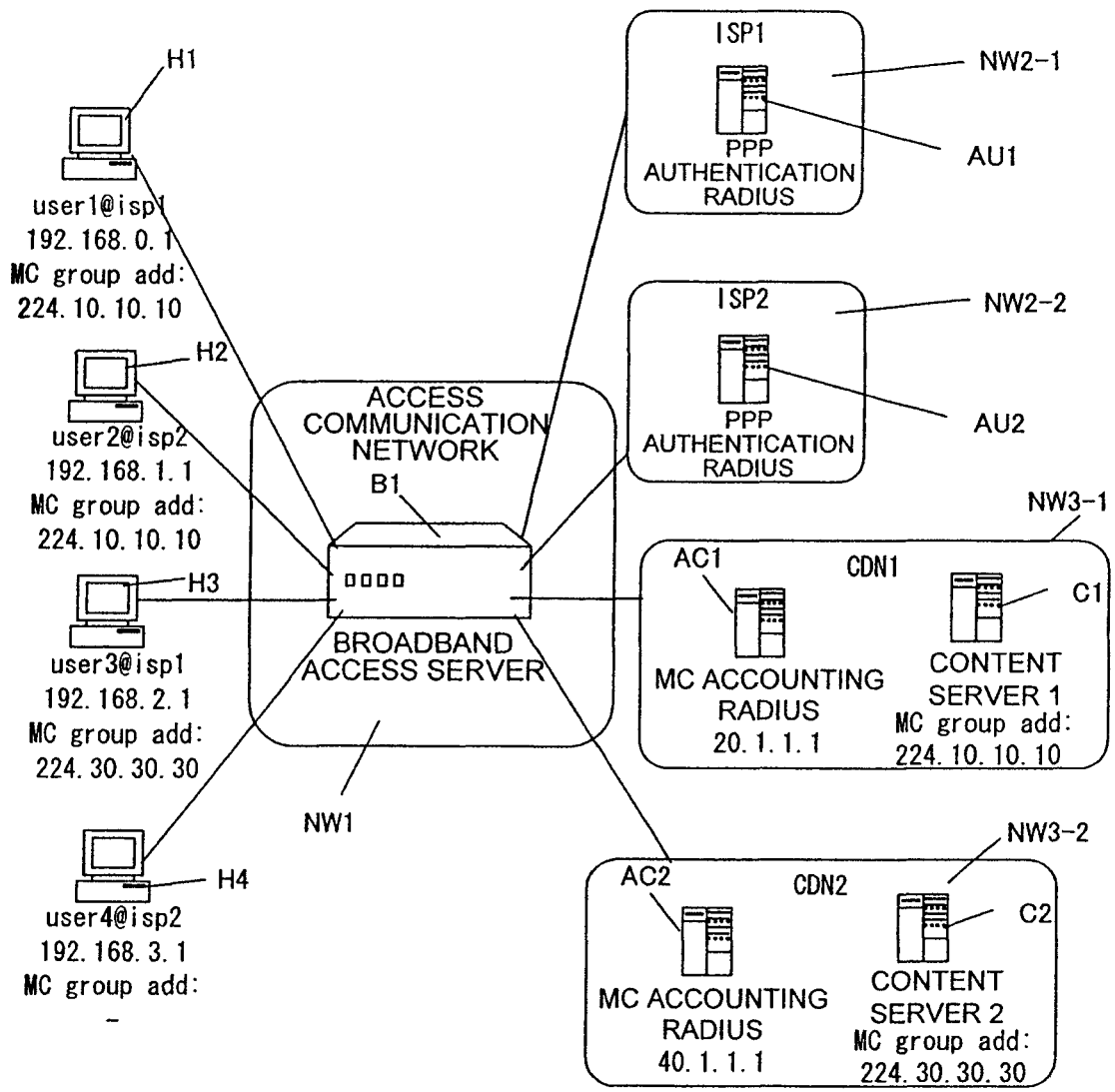
FIG. 1 shows the configuration of a communications system of a first embodiment.

FIG. 1 shows the network configuration of a communications system according to a first embodiment. The system includes a plurality of user terminals (hereafter referred to as users) H1 to H4, a broadband access server B1, Internet service providers (ISPs) NW2-1 and NW2-2, and content distribution networks (CDNs) NW3-1 and NW3-2 provided by content distribution operators. The ISPs NW2-1 and NW2-2 include PPP authentication radius servers AU1 and AU2 respectively. The CDNs NW3-1 and NW3-2 include content distribution servers C1 and C2 and multicast accounting radius servers AC1 and AC2 respectively. The broadband access server B1 is connected to the users H1 to H4, the ISPs NW2-1 and NW2-2, and the CDNs NW3-1 and NW3-2. In the first embodiment, the multicast accounting radius servers AC1 and AC2 can manage the user accounting information collectively for the purpose of accounting control.

The users H1 to H3 shown in FIG. 1 are multicast users subscribing to content distribution operators. The multicast users H1 to H3 are assigned a multicast group address corresponding to a multicast program. The user H4 is not assigned a multicast group address and is not a multicast user.

The content distribution servers C1 and C2 distribute a program to multicast users having an identical multicast address. In FIG. 1, the content distribution server C1 distributes a multicast program to the multicast users H1 and H2, and the content distribution server C2 distributes a multicast program to the multicast user H3.

Figure 2:
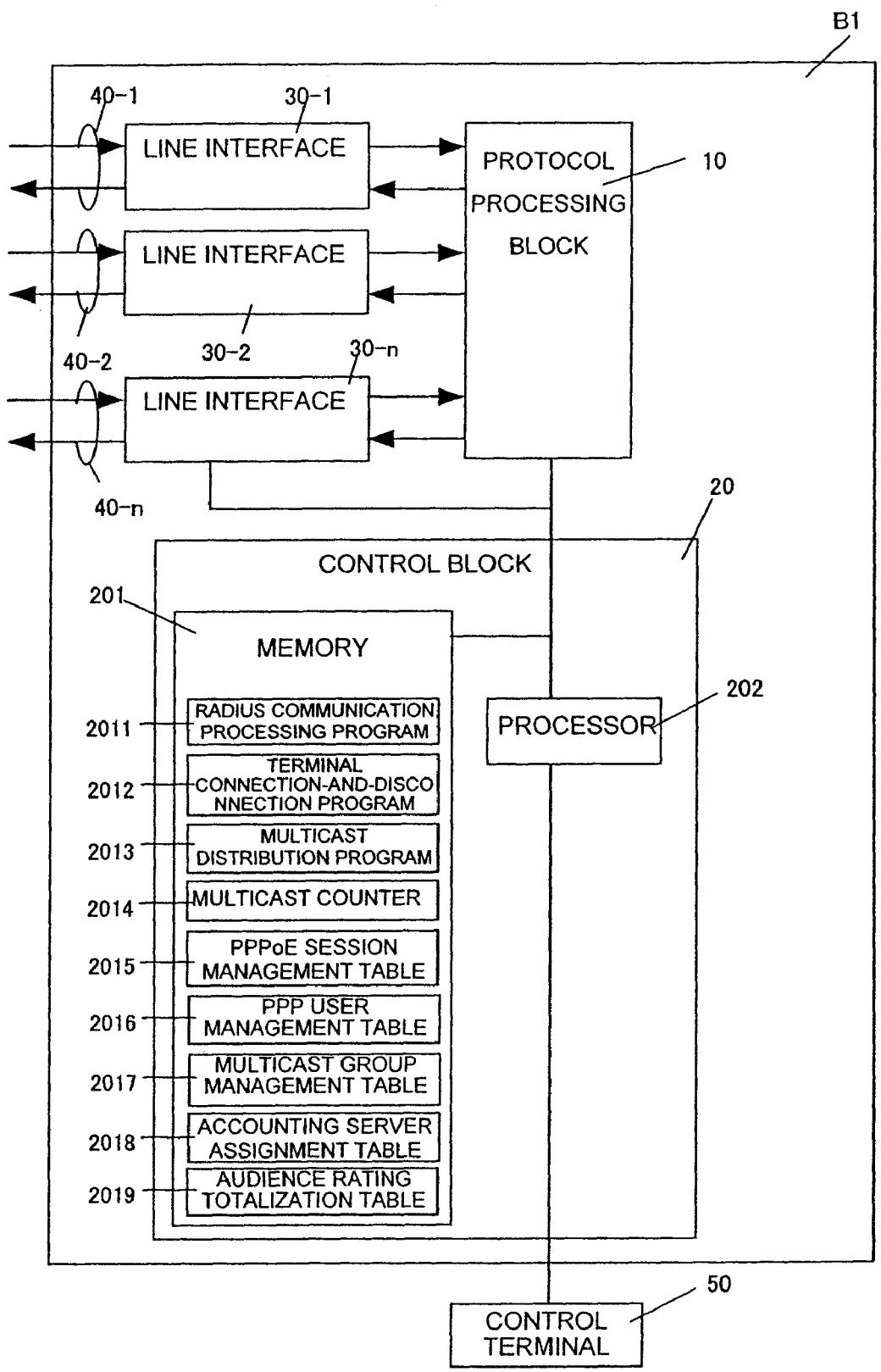
FIG. 2 shows the configuration of a broadband access server of the present invention.

FIG. 2 shows the configuration of the broadband access server B1 of the first embodiment. The broadband access server B1 includes a plurality of input-and-output line interfaces 30-1 to 30-n (n is a natural number), a protocol processing block 10, and a control block 20. The input-and-output line interfaces 30-1 to 30-n and the protocol processing block 10 are controlled by the control block 20 or an external control terminal 50.

The control block 20 includes a memory 201 and a processor 202. The memory 201 stores processing programs 2011 to 2014 and tables 2015 to 2019, and the processor 202 executes the processing programs 2011 to 2014.

The processing program 2011 is a radius communication processing program for enabling communication with a radius server AU1, AU2, AC1, or AC2. The processing program 2012 is a terminal connection-and-disconnection program for allowing or canceling Internet access from a terminal. The processing program 2013 is a multicast distribution program for performing multicast user authentication, multicast routing, multicast packet replication and transfer, and multicast counter referencing. The processing program 2014 is a multicast counter for counting bytes and packets distributed to each multicast group address. One multicast counter 2014 is stored for each multicast group address. The counter of the first embodiment counts both the number of bytes of a distributed content and the number of distributed multicast packets, but the counter may count and store either number.

The table 2015 is a PPP over Ethernet (PPPoE) session management table for managing PPPoE connection information. The table 2016 is a PPP user management table for managing the information of PPP users. The table 2017 is a multicast group management table for managing multicast routing information indicating the replication and transfer destination of a multicast packet. The table 2018 is an accounting server assignment table for managing multicast accounting radius server information. The table 2019 is an audience rating totalization table of each multicast group address.

FIG. 3A and FIG. 3B show the configuration of the PPPoE session management table 2015. The table stores a PPPoE session ID 20151 and a PPP user ID 20152 in correspondence with each other.

The PPPoE session ID 20151 is added to the PPPoE session management table 2015 after a PPPoE session is established between a user H1, H2, H3, or H4 and the broadband access server B1. The PPP user ID 20152 corresponding to the PPPoE session ID is added to the PPPoE session management table 2015 after PPP user authentication finishes.

FIG. 4 shows the configuration of the PPP user management table 2016. The table stores a PPP user ID 20161, a multicast group address 20162, and a multicast session ID 20163 in correspondence with one another.

The PPP user ID 20161 corresponds to the PPP user ID 20152 in the PPPoE session management table 2015. The multicast group address 20162 indicates a program which can be viewed or listened to by the corresponding user. The broadband access server B1 obtains the multicast group address of a user H1, H2, or H3 from the PPP authentication radius server AU1 or AU2 and adds the multicast group address to the PPPoE session management table 2015. The multicast session ID 20163 is an identifier used when a multicast accounting is conducted. The multicast session ID 20163 is added to the PPP user management table 2016 when a usage-based accounting of multicasting starts. The multicast session ID 20163 is deleted from the PPP user management table 2016 when the accounting ends.

In this embodiment, a multicast session ID is generated from a PPP user ID and a multicast group address corresponding to a multicast program, so that a usage-based accounting of each multicast user and each multicast program can be provided. The multicast session ID is a combination of a PPP user ID, a V4-or-V6 descriptor, and a multicast group address. The multicast session ID of the user H3 can be expressed as user3@isp1.sub.—4#224.30.30.30, for instance. A multicast session ID for IPv6 multicasting can be expressed as user7@isp4.sub.—6#ff00::11, for instance.

FIG. 5 shows the configuration of the multicast group management table 2017. The table stores a multicast group address 20171 and a PPPoE session ID 20172 in correspondence with each other. The multicast group management table 2017 is created after the membership of a multicast user H1, H2, or H3 in a multicast group is authenticated.

FIG. 6 shows the configuration of the accounting server assignment table 2018. The table indicates a multicast group address 20181, a unicast address 20182 of a multicast accounting radius server AC1 or AC2 at the multicast group address, and a CDN identifier 20183 of a CDN containing the multicast accounting radius server AC1 or AC2. The items of the accounting server assignment table 2018 are specified in advance by a maintenance person or others, on the basis of subscriptions to the CDNs NW3-1 and NW3-2 and the ISPs NW2-1 and NW2-2.

Figure 10:
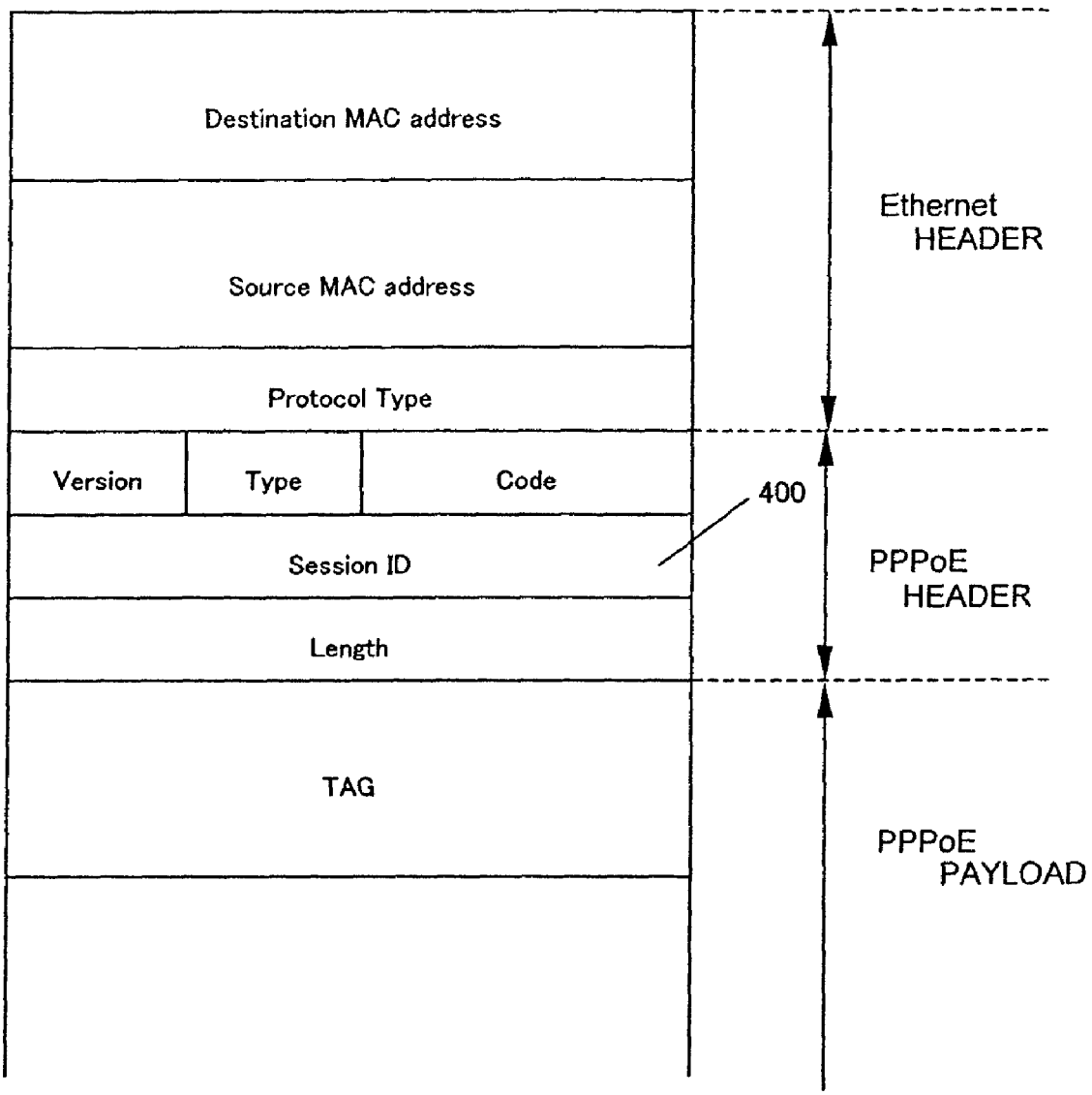
FIG. 10 shows a PPPoE frame.

FIG. 10 shows a PPPoE frame. The PPPoE frame contains an Ethernet (registered trademark) header, a PPPoE header, and a PPPoE payload. The PPPoE header contains a session ID 400.

FIG. 20 shows the configuration of a usage-based multicast accounting table 6000 in the multicast accounting radius server AC1 or AC2. The usage-based multicast accounting table 6000 stores a multicast session ID 60001, a PPP user ID 60002, a multicast group address 60003, an accounting status

60004, a session time 60005, a byte count 60006, and a packet count 60007 in correspondence with one another.

If the accounting status 60004 is "start", the values of the multicast counter 2014 at the beginning of multicast distribution are indicated. If the accounting status 60004 is "stop", the values of the multicast counter 2014 at the end of multicast distribution are indicated. The accounting status 60004 is stored in accordance with an acct-status-type attribute, which will be described later.

The multicast accounting radius server AC1 or AC2 calculates the number of distributed bytes and the number of distributed packets per multicast session ID by subtracting a counter value at the beginning of multicast distribution from a counter value at the end of multicast distribution. A usage-based accounting is provided in accordance with the calculated result.

The multicast accounting radius server AC1 or AC2 calculates the listening-or-viewing period of each multicast session ID by subtracting the reception time of a Multicast Accounting-Request Start message from the reception time of a Multicast Accounting-Request Stop message, the messages coming from the broadband access server B1. In accordance with the calculated result, a usage-based accounting is provided. A bit rate or the like obtained by dividing the number of distributed bytes or the number of distributed packets by the listening-or-viewing period may also be used to provide a usage-based accounting in accordance with the bit rate or the like.

(Start of Usage-Based Accounting)

Figure 7:
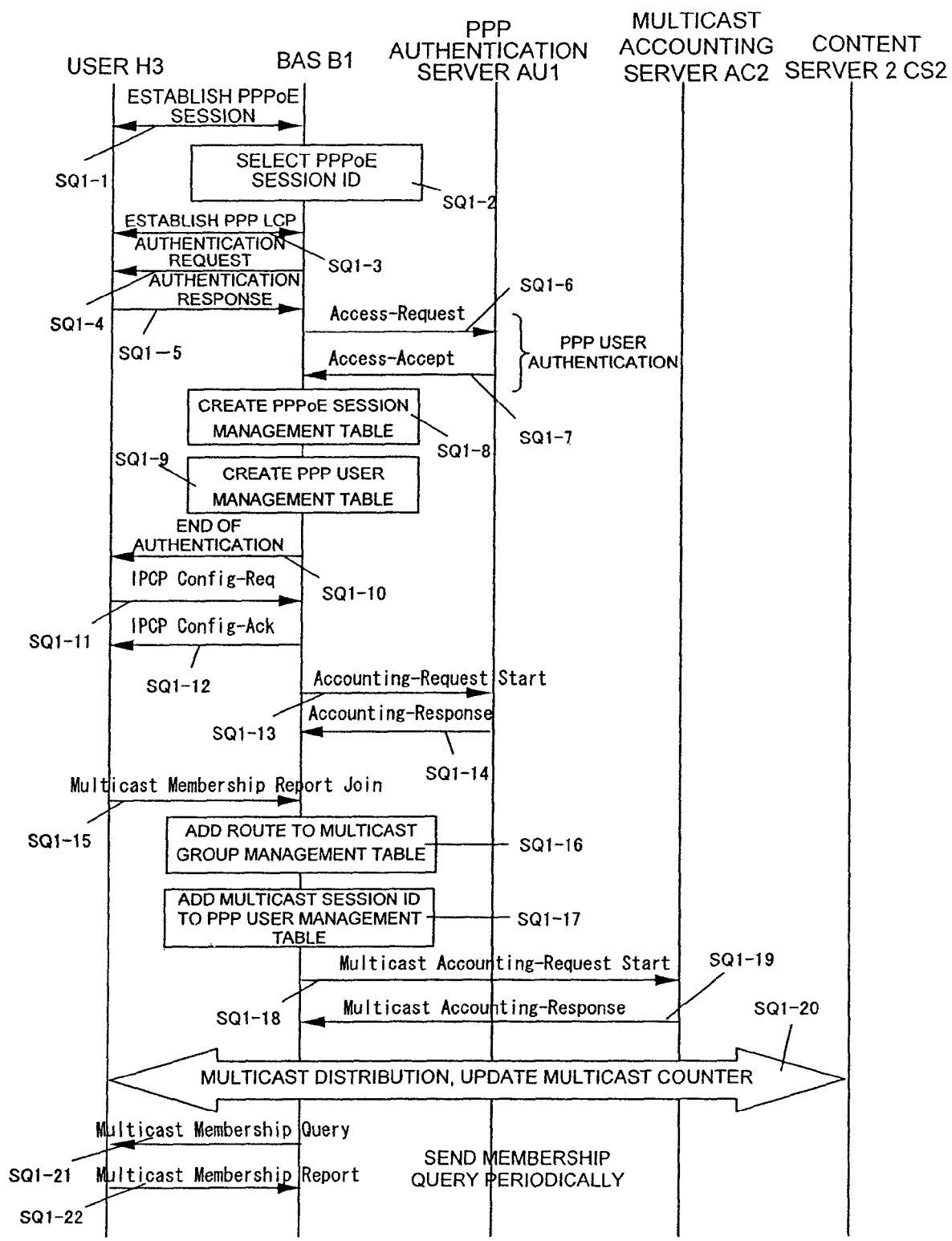
FIG. 7 shows a sequence for starting a usage-based accounting of the first and third embodiments.
Figure 8:
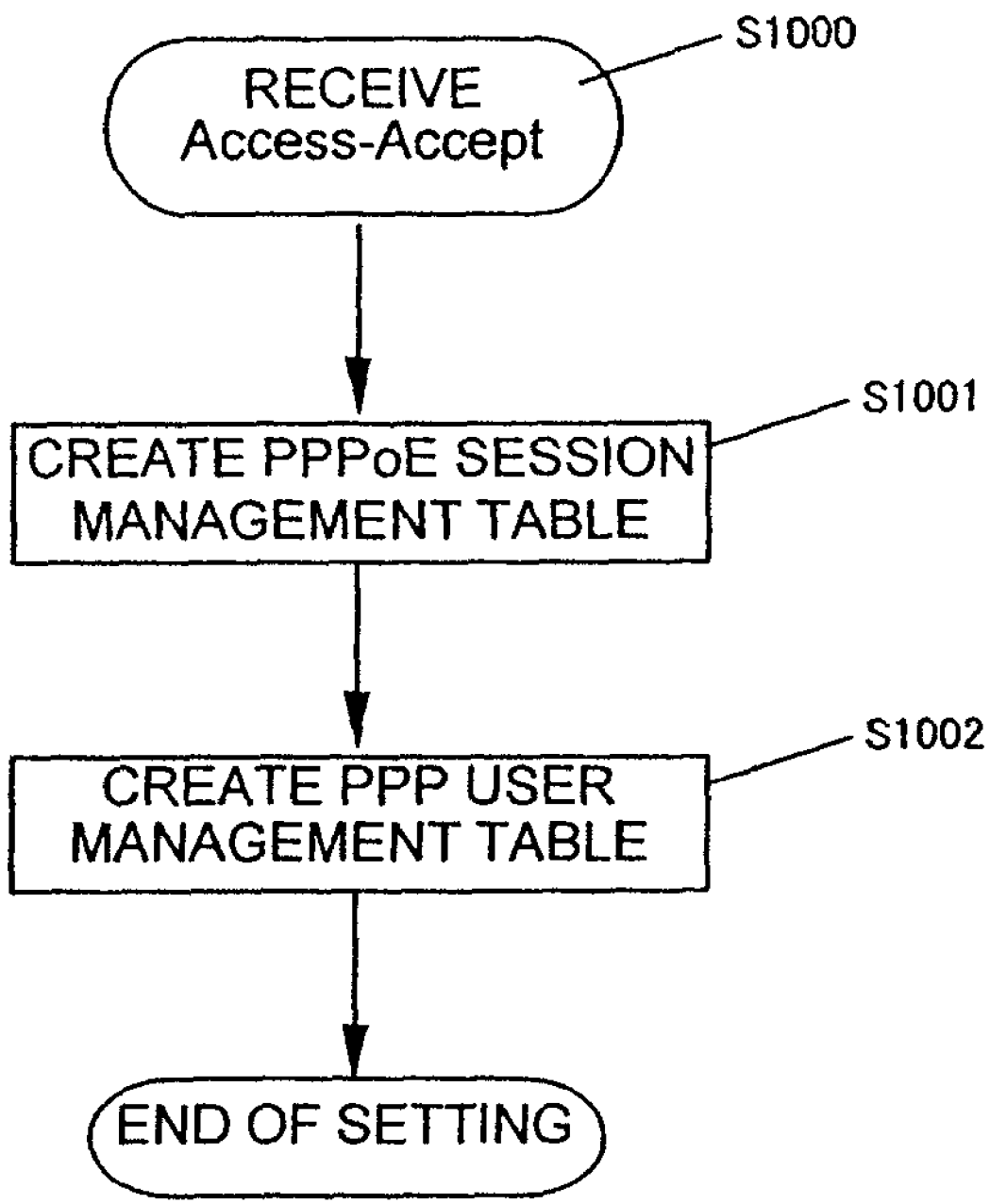
FIG. 8 shows a flow chart of PPP connection processing in the broadband access server of the present invention.
Figure 9:
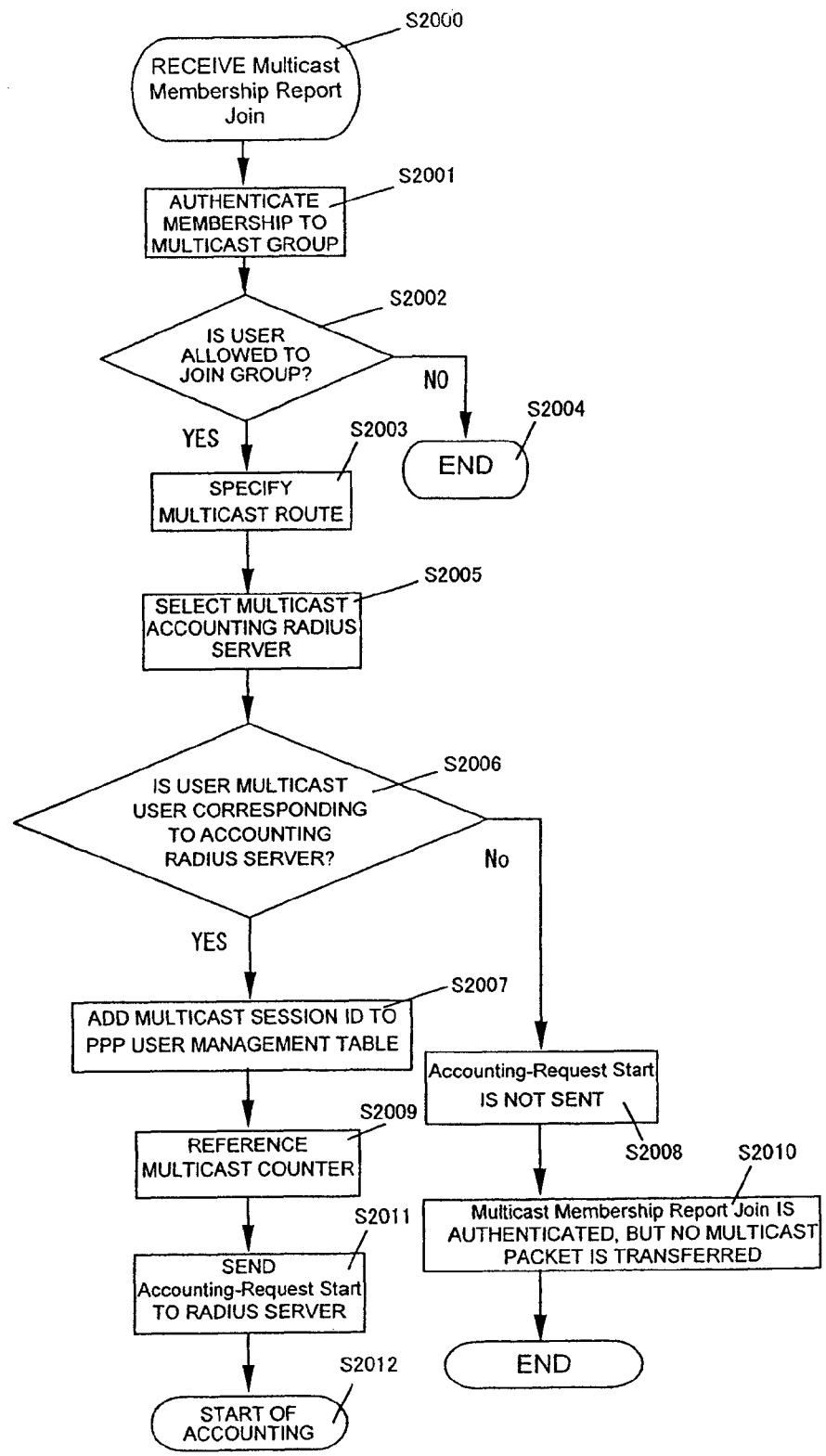
FIG. 9 shows a flow chart of processing to start a usage-based accounting by the broadband access server of the first and third embodiments.

FIG. 7 shows a sequence SQ1 for making a PPP connection between the multicast user H3 and the broadband access server B1 and starting a usage-based accounting of multicasting when the multicast user H3 joins a multicast group. FIG. 8 shows a flow chart of PPP connection processing in the broadband access server B1. FIG. 9 shows a flow chart of the processing to start a usage-based accounting by the broadband access server B1.

A PPPoE session is first established between the user H3 and the broadband access server B1 (SQ1-1) by the terminal connection-and-disconnection program 2012, for instance. After the PPPoE session is established, the terminal connection-and-disconnection program 2012 in the broadband access server B1 references the session ID 400 in the PPPoE frame, shown in FIG. 10, and adds the PPPoE session ID of the user H3 to the PPPoE session ID 20151 field the PPPoE session management table 2015 (SQ1-2). FIG. 3A shows that "3" has been added as the PPPoE session ID. A PPP link control protocol (LCP) is established between the user H3 and the broadband access server B1 (SQ1-3).

The broadband access server B1 prompts the user H3 to send a PPP user ID and a password (SQ1-4), in order to check whether the user H3 has access to the Internet. The user H3 sends the PPP user ID and the password to the broadband access server B1 (SQ1-5). The radius communication processing program 2011 in the broadband access server B1 sends an Access-Request message including the PPP user ID and password of the user H3 to the PPP authentication radius server AU1 managed by ISPI NW2-1 (SQ1-6), in order to verify whether the PPP user ID and the password are valid.

The PPP authentication radius server AU1 determines whether the received PPP user ID and password are valid, in accordance with a PPP user ID, password, and other user information held beforehand. If the ID and password are valid, the PPP authentication radius server AU1 sends an Access-Accept message for allowing access to the Internet, to the broadband access server B1 (SQ1-7). The PPP authentication radius server AU1 also stores beforehand a multicast group address allowed to the user and sends the Access-Accept message including the multicast group address and the PPP user ID to the broadband access server B1.

After the broadband access server B1 receives the Access-Accept message, the terminal connection-and-disconnection program 2012 adds the PPP user ID of the user H3 to the PPP user ID 20152 field of the PPPoE session management table 2015 (SQ1-8; S1001 in FIG. 9). FIG. 3B shows that "user3@isp1" has been added as the PPP user ID of the user H3.

After the PPPoE session management table 2015 is created, the broadband access server B1 obtains the PPP user ID and the multicast group address allowed to the user H3 from the Access-Accept message sent from the PPP authentication radius server AU1. The terminal connection-and-disconnection program 2012 adds the PPP user ID and the multicast group address to the PPP user ID field 20161 and the multicast group address field 20162 of the PPP user management table 2016 (SQ1-9; S1002 in FIG. 8). FIG. 4A shows that "user3@isp1" and "224.30.30.30" have been added respectively as the PPP user ID and the multicast group address of the user H3.

The broadband access server B1 sends a PPP authentication completion notice to the user H3 (SQ1-10). Then, the user H3 sends an IPCP Config-Req message to the broadband access server B1 (SQ1-11). The broadband access server B1 sends an IPCP Config-Ack message including an IP address to the user H3 (SQ1-12).

The broadband access server B1 sends an Accounting-Request Start message requesting the start of PPP accounting, to the PPP authentication radius server AU1 (SQ1-13). When the broadband access server B1 receives an Accounting-Response message acknowledging the start of PPP accounting from the PPP authentication radius server AU1 (SQ1-14), the user H3 is allowed to access the Internet.

After the PPP connection is established, the user H3 sends a Membership Report Join message requesting membership in a multicast group, to the broadband access server B1 (SQ1-15). The Membership Report Join message contains the PPP user ID and a multicast group address, for instance.

FIG. 9 shows the flow chart of the processing to start a usage-based accounting by the broadband access server B1. When the broadband access server B1 receives a Membership Report Join message from the user H3, the multicast distribution program 2013 references the PPP user management table 2016 and authenticates the membership of the user H3 in the multicast group (S2001 in FIG. 9). The multicast distribution program 2013 checks whether the PPP user ID and the multicast group address contained in the Membership Report Join message agree with those stored in the PPP user management table 2016, for instance.

If the user is allowed to join the group (S2002 in FIG. 9), the multicast distribution program 2013 in the broadband access server B1 specifies a multicast route indicating the replication and transfer destination of the multicast packet, in the multicast group management table 2017 (SQ1-16). The multicast distribution program 2013 adds the multicast group address and PPPoE session ID contained in the Membership Report Join message in correspondence with each other in the multicast group management table 2017, for instance. The PPPoE session ID can be obtained from the header of the Membership Report Join message, for instance. If the user is not allowed to join the group (S2002 in FIG. 9), the processing ends (S2004 in FIG. 9).

The multicast distribution program 2013 in the broadband access server B2 selects whether the multicast accounting radius server AC1 or AC2 totalizes and stores the accounting generation information indicating the number of distributed bytes, the number of distributed packets, and the distribution time of the user H3, with reference to the accounting server assignment table 2018 including items added beforehand by a maintenance person, under subscriptions to the CDNs NW3-1 and NW3-2 and the ISPs NW2-1 or NW2-2 (S2005 in FIG. 9). The accounting server assignment table 2018 shown in FIG. 6 indicates that the user H3 with multicast address "224.30.30.30" corresponds to the multicast accounting server AC2 with unicast address "40.1.1.1" provided in CDN2 NW3-2. In the network of this embodiment, the multicast accounting radius servers AC1 and AC2 are provided in the CDNs NW3-1 and NW3-2 respectively, so that the multicast accounting radius servers AC1 and AC2 are selected in accordance with the multicast group address.

The multicast distribution program 2013 in the broadband access server B1 checks whether the user is a multicast user corresponding to the selected accounting radius server (S2006 in FIG. 9). For instance, if the multicast distribution program 2013 finds that the accounting server assignment table 2018 contains the address of the multicast accounting radius server and the CDN corresponding to the multicast group address, the user is determined to be a multicast user of the accounting radius server. If not, the user is not determined to be a multicast user of the accounting radius server. In the latter case, the multicast distribution program 2013 does not send an Accounting-Request Start message (S2008). The Multicast Membership Report Join message is verified, but the processing ends without transferring a multicast packet to the corresponding multicast user (without performing multicast distribution).

If the user is determined to a multicast user (S2006), the broadband access server B1 creates a multicast group management table 2017, and the multicast distribution program 2013 generates the multicast session ID 20163 of the user H3 and adds the multicast session ID 20163 to the PPP user management table 2016, in correspondence with the PPP user ID (SQ1-17; S2007 in FIG. 9). FIG. 4B shows that the multicast session ID "user3@isp1.sub.—4#224.30.30.30" has been added. The ".sub.—4" portion of the multicast session ID is a descriptor of IPv4 multicasting. A descriptor of IPv6 multicasting is ".sub.—6". The multicast session ID is created from the PPP user ID and the multicast group address included in the Membership Report Join message by the multicast distribution program 2013, for instance.

The multicast distribution program 2013 in the broadband access server B1 obtains the byte count and the packet count corresponding to the multicast group address from the multicast counter 2014 (S2009 in FIG. 9). The multicast distribution program 2013 can reference the multicast counter 2014 when the user joins a group. For instance, the broadband access server B1 obtains the byte count "200" and the packet count "50" corresponding to the multicast group address "224.30.30.30" from the multicast counter 2014 shown in FIG. 16A, when the user joins the group.

The multicast distribution program 2013 specifies the byte count and the packet count obtained from the multicast counter 2014 and the multicast session ID "user3@isp1.sub.—4#224.30.30.30" of the user H3 in a Multicast Accounting-Request Start message requesting the start of multicast accounting, which is sent to the multicast accounting radius server AC2 (SQ1-18; S2011 in FIG. 9). The message is sent to the multicast accounting radius server AC2 by the radius communication processing program 2011.

The multicast accounting radius server AC2 receives the Multicast Accounting-Request Start message, and stores the accounting status, session time (minutes), byte count, and packet count in correspondence with the multicast session ID in the usage-based multicast accounting table 6000, as shown in FIG. 20. An internal clock of the multicast accounting radius server AC2 can be used for the session time, and the reception time of the Multicast Accounting-Request Start message can be stored, for instance.

The multicast accounting radius server AC2 returns a Multicast Accounting-Response message acknowledging the start of accounting to the broadband access server B1 (SQ1-19). This enables multicast distribution from the content distribution server C2 to the user H3. A usage-based accounting of multicasting is provided (SQ1-20) until information to stop the distribution, which will be described later, is sent to the multicast accounting radius server AC2.

The broadband access server B1 sends a Multicast Membership Query message confirming a multicast user connection periodically to the user, in order to check whether the multicast user is interfaced (SQ1-21). While the multicast user H3 is viewing or listening to a multicast program, the multicast user H3 sends a Multicast Membership Report message acknowledging the user connection to the broadband access server B1, in response to the Multicast Membership Query message (SQ1-22).

(End of Usage-Based Accounting)

When any of the following occurs, the channel of a user H1, H2, H3, or H4 is terminated by PPP, and the broadband access server B1 performing multicast distribution stops a usage-based accounting.

(1) The multicast user H1, H2, or H3 leaves a multicast group by sending a Leave Group message for leaving the multicast group.

(2) The multicast user H1, H2, or H3 leaves a multicast group by not sending a Multicast Membership Report message in response to a Multicast Membership Query message.

(3) The PPP connection between the multicast user H1, H2, or H3 and the broadband access server B1 is broken.

The fact that the user leaves a multicast group may be detected by any other method, and the accounting may be stopped accordingly. The sequences triggered by (1), (2), and (3) indicated above will now be described.

Figure 11:
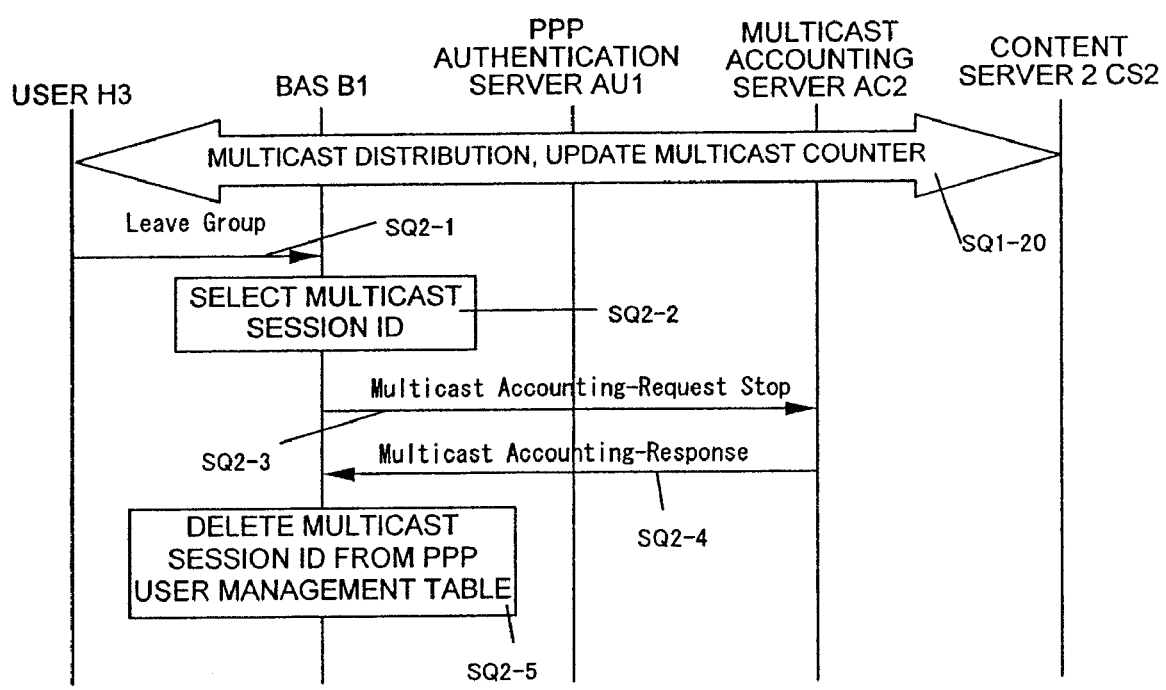
FIG. 11 shows a sequence for stopping a usage-based accounting when a Leave Group message is received, in the first and third embodiments.
Figure 13:
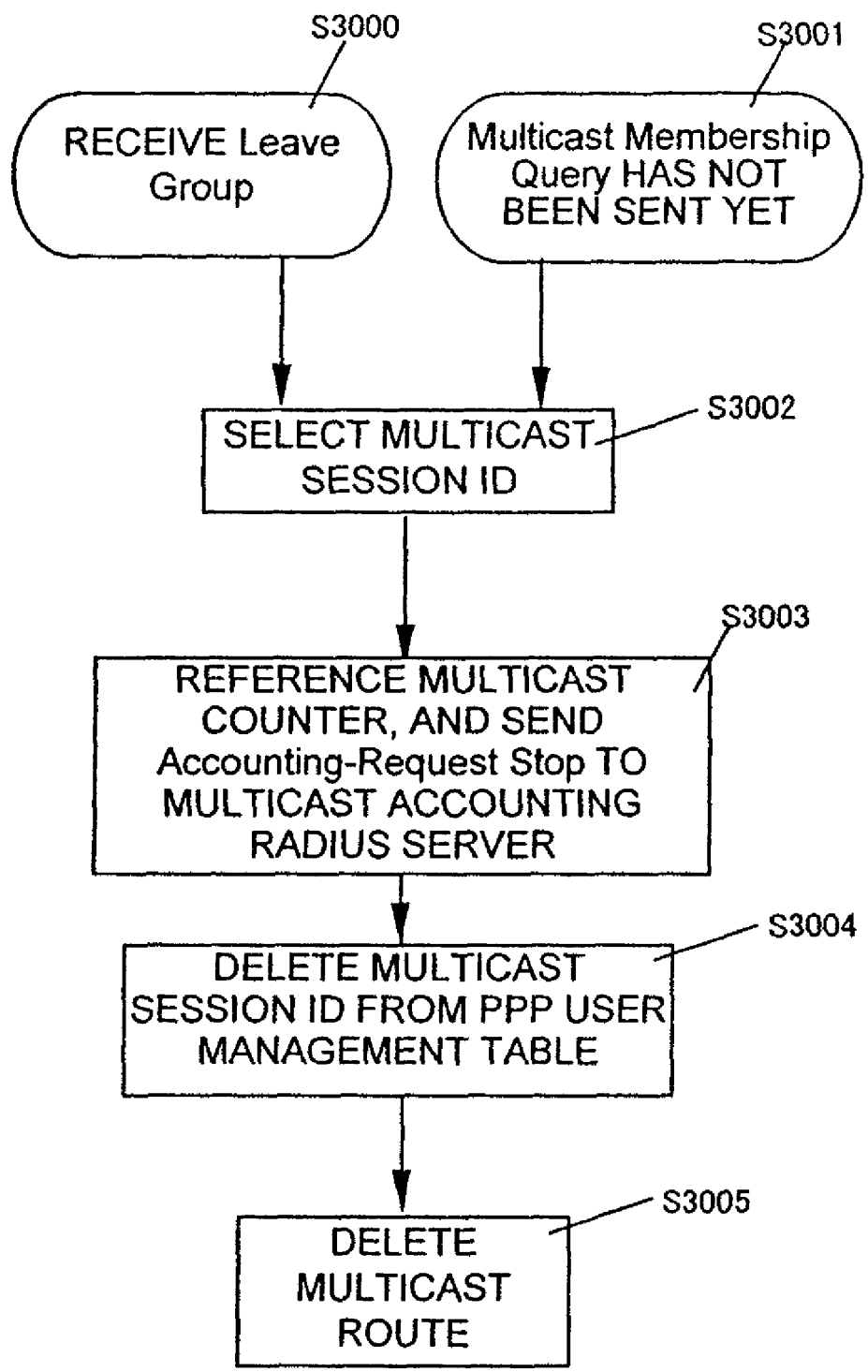
FIG. 13 shows a flow chart of processing to stop a usage-based accounting in the broadband access server of the present invention.

FIG. 11 shows a sequence SQ2 for stopping a usage-based accounting of multicasting when the multicast user H3 leaves a multicast group. FIG. 13 shows a flow chart of the processing to stop a usage-based accounting in the broadband access server B1.

The user H3 sends a Leave Group message for leaving a multicast group to the broadband access server B1 (SQ2-1). The Leave Group message contains either or both of the PPP user ID and the multicast group address. After the broadband access server B1 receives the Leave Group message from the user H3, the multicast distribution program 2013 of the broadband access server B1 selects the multicast session ID "user3@isp1.sub.—4#224.30.30.30" of the user H3 (SQ2-2; S3002 in FIG. 13). For instance, the broadband access server B1 selects the multicast session ID in the multicast session ID 20163 field of the PPP user management table 2016, corresponding to the PPP user ID contained in the Leave Group message.

Figures 16A, 16B:
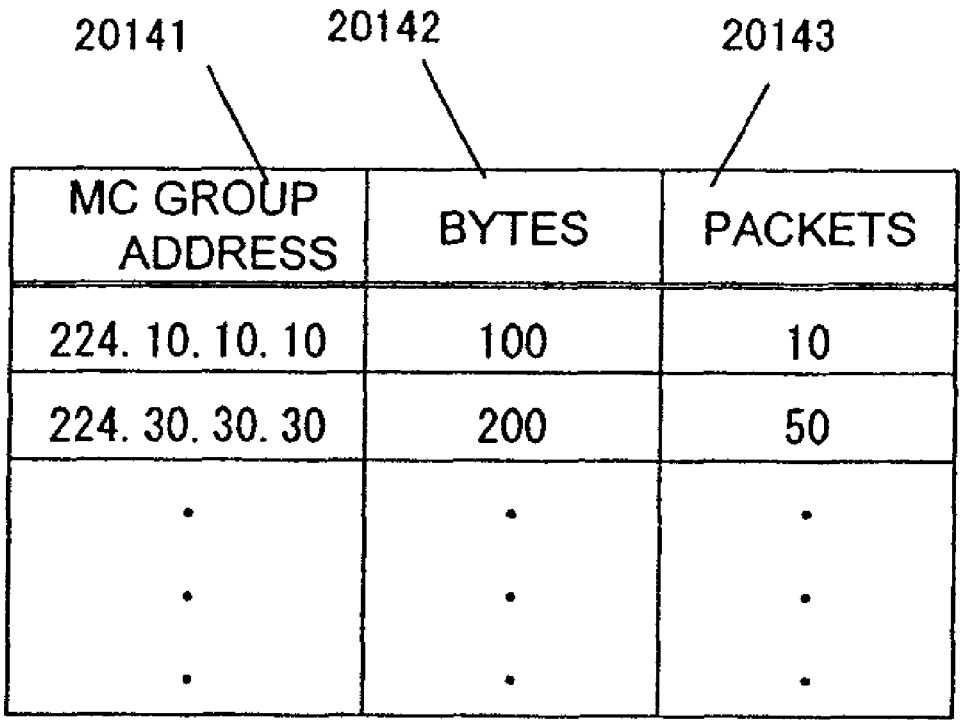
FIG. 16A and FIG. 16B show the configuration of a multicast counter of the present invention.

The multicast distribution program 2013 of the broadband access server B1 obtains the byte count and the packet count corresponding to the multicast group address from the multicast counter 2014 when the user terminal H3 leaves the group. For instance, the multicast distribution program 2013 obtains the byte count "355" and the packet count "88" corresponding to the multicast group address "224.30.30.30" from the table of the counter as shown in FIG. 16B. The multicast distribution program 2013 specifies the values of the multicast counter 2014 such as the byte count and the packet count of the user H3 and the multicast session ID "user3@isp1.sub.—4#224.30.30.30" of the user H3 in a Multicast Accounting-Request Stop message requesting the stop of multicast accounting, which is sent to the multicast accounting radius server AC2 (SQ2-3; S3003 in FIG. 13). The radius communication processing program 2011 sends the message to the multicast accounting radius server AC2.

The multicast accounting radius server AC2 returns a Multicast Accounting-Response message acknowledging the stop of accounting, to the broadband access server B1 (SQ2-4). This stops multicast accounting and multicast distribution concerning the user H3.

Figure 25:
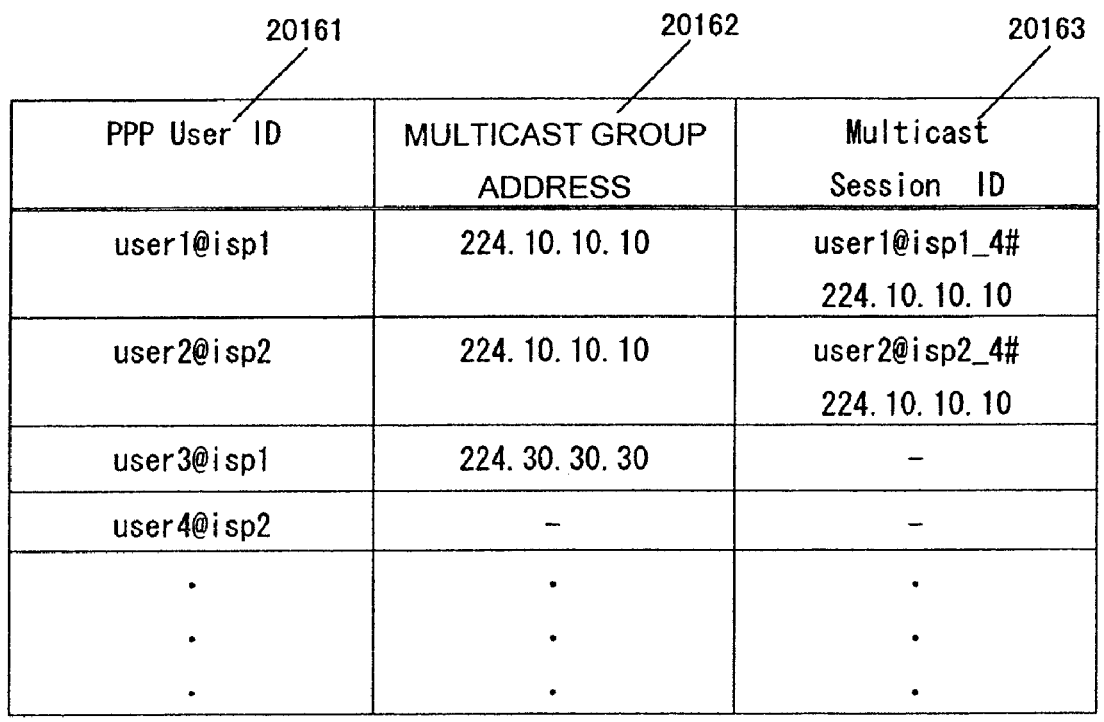
FIG. 25 shows the configuration of the PPP user management table of the present invention.

After multicast accounting and multicast distribution stop, the multicast distribution program 2013 of the broadband access server B1 deletes the multicast session ID of the user H3 from the PPP user management table 2016 (SQ2-5; S3004 in FIG. 13). FIG. 25 shows that the multicast session ID "user3@isp1.sub.—4#224.30.30.30" has been deleted from the multicast session ID 20163 field of the PPP user management table 2016. The broadband access server B1 also deletes the multicast route (S3005 in FIG. 13). For instance, the broadband access server B1 deletes the corresponding PPPoE session ID from the multicast group management table 2017.

In this embodiment, the multicast session ID 20163 of the user H3 is deleted from the PPP user management table 2016, and the PPP connection between the user H3 and the broadband access server B1 is maintained.

Figure 12:
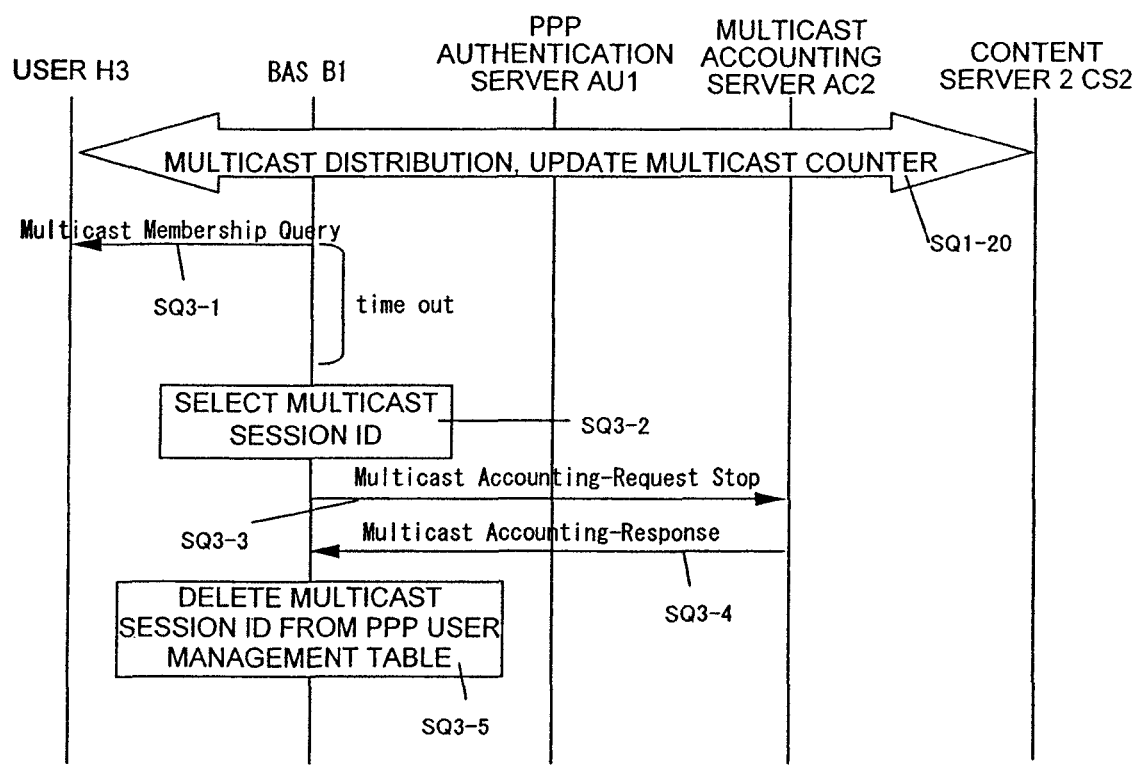
FIG. 12 shows a sequence for stopping a usage-based accounting when a Membership Report message is not returned in the first and third embodiments.

FIG. 12 shows a sequence SQ3 for stopping a usage-based accounting of multicasting when a Multicast Membership Report message is not returned in time. This sequence SQ3 will be described with reference to FIG. 12 and FIG. 13.

The multicast distribution program 2013 in the broadband access server B1 sends a Multicast Membership Query message confirming a multicast user connection, to the user H3 (SQ3-1). If the user H3 does not return a Multicast Membership Report message to the broadband access server B1 within a predetermined period after the Multicast Membership Query message is sent, the multicast distribution program 2013 selects the multicast session ID of the user H3 (SQ3-2; S3002 in FIG. 13). For instance, the multicast distribution program 2013 selects the multicast session ID "user3@isp1.sub.—4#224.30.30.30" from the multicast session ID field 20163 of the PPP user management table 2016, in accordance with the PPP user ID of the user to which the broadband access server B1 has sent the Multicast Membership Query message.

The multicast distribution program 2013 in the broadband access server B1 obtains the values such as the byte count and the packet count of the user H3 from the multicast counter 2014 of the multicast group address concerning the user H3, and specifies those values and the multicast session ID "user3@isp1.sub.—4#224.30.30.30" of the user H3 in a Multicast Accounting-Request Stop message requesting the stop of multicast accounting. The radius communication processing program 2011 sends the message to the multicast accounting radius server AC2 (SQ3-3; S3003 in FIG. 13). The processing SQ3-4 and SQ3-5 are executed in the same manner as SQ2-4 and SQ2-5 shown in FIG. 11.

Figure 14:
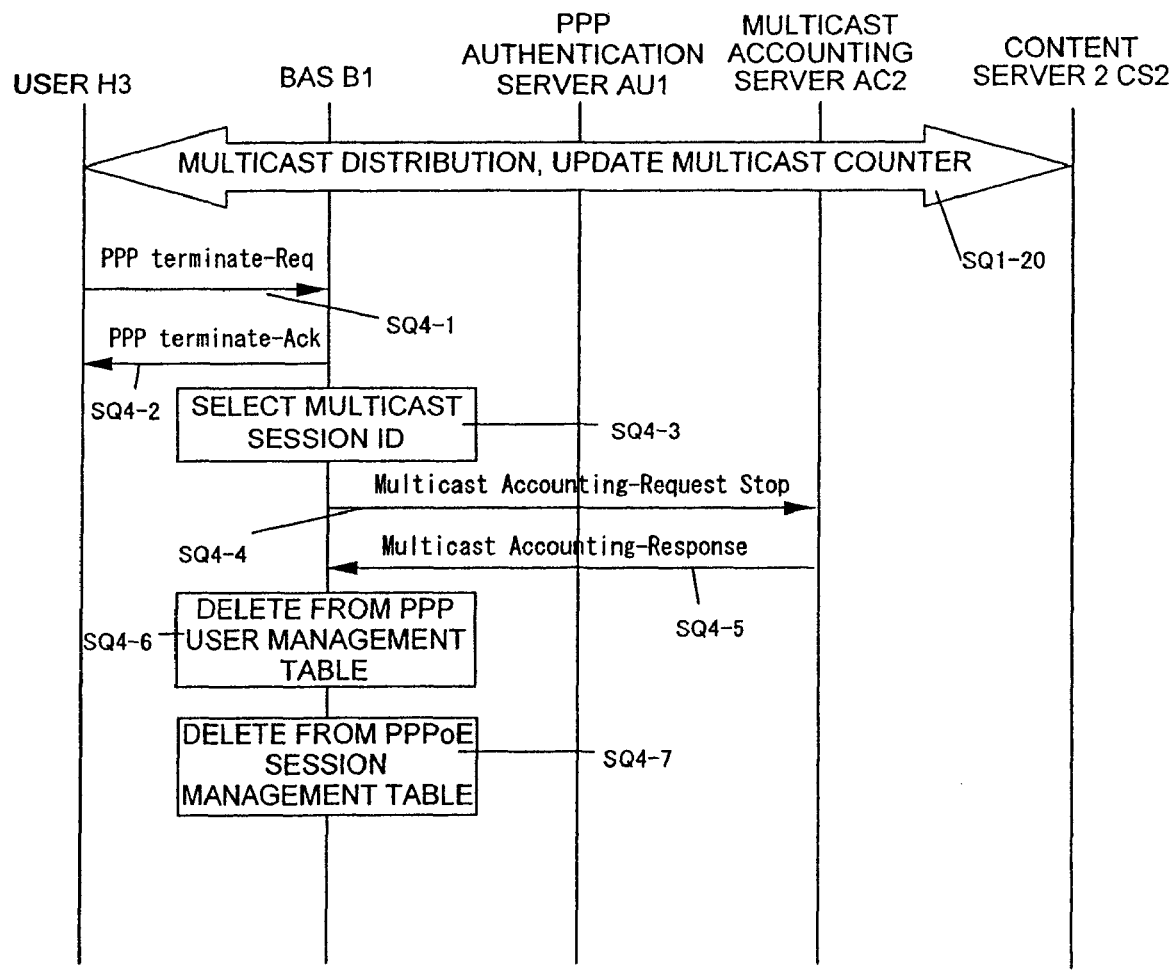
FIG. 14 shows a sequence for stopping a usage-based accounting when a PPP connection is broken in the first and third embodiments.
Figure 15:
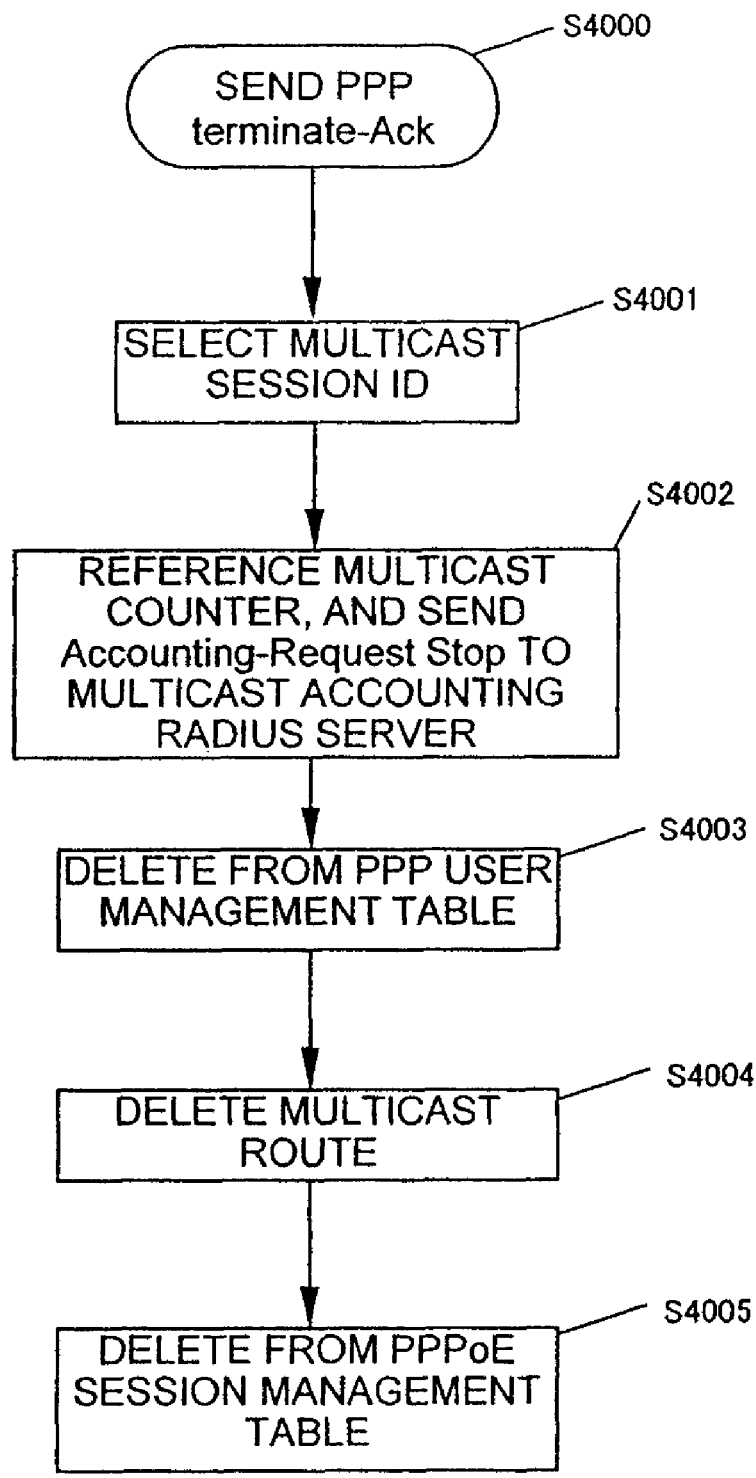
FIG. 15 shows a flow chart of processing to stop a usage-based accounting by the broadband access server of the first and third embodiments, when a PPP connection is broken.

FIG. 14 shows a sequence SQ4 for stopping a usage-based accounting of multicasting when a PPP connection is broken. FIG. 15 shows a flow chart of the processing to stop a usage-based accounting in the broadband access server B1 when a PPP connection is broken.

The user H3 sends a PPP terminate-Req message to the broadband access server B1 (SQ4-1). The PPP terminate-Req message contains the PPP user ID, for instance. The broadband access server B1 sends a PPP terminate-Ack message to the user H3, in response to the PPP terminate-Req message (SQ4-2). Then, the PPP connection between the user H3 and the broadband access server B1 is broken (or the PPP session is released).

As the flow chart of FIG. 15 shows, the multicast distribution program 2013 of the broadband access server B1 selects the multicast session ID 20163 of the user H3 (SQ4-3; S4001 in FIG. 15). For instance, the broadband access server B1 selects the multicast session ID "user3@isp1.sub.—4#224.30.30.30" from the PPP user management table 2016, in accordance with the PPP user ID contained in the PPP terminate-Req message. The broadband access server B1 may further select a multicast group address corresponding to the PPP user ID.

The multicast distribution program 2013 of the broadband access server B1 obtains the byte count and the packet count from the multicast counter 2014 of the multicast group address concerning the user H3. The multicast distribution program 2013 specifies the obtained values of the multicast counter 2014 such as the byte count and packet count of the user H3 and the multicast session ID "user3@isp1.sub.—4#224.30.30.30" of the user H3 in a Multicast Accounting-Request Stop message, and the radius communication processing program 2011 sends the message to the multicast accounting radius server AC2 (SQ4-4; S4002 in FIG. 15).

The multicast accounting radius server AC2 returns a Multicast Accounting-Response message acknowledging the stop of accounting to the broadband access server B1, in response to the Multicast Accounting-Request Stop message (SQ4-5).

Because the PPP connection with the user H3 has been broken, the terminal connection-and-disconnection program 2012 of the broadband access server B1 deletes the PPP user ID of the user H3 and the multicast group address and multicast session ID corresponding to the PPP user ID, from the PPP user ID field 20161, the multicast group address field 20162, and the multicast session ID field 20163 of the PPP user management table 2016 (SQ4-6; S4003 in FIG. 15). The broadband access server B1 deletes the corresponding multicast route. The broadband access server B1 deletes the corresponding PPPoE session ID from the multicast group management table 2017, for instance.

After the corresponding data is deleted from the PPP user management table 2016, the terminal connection-and-disconnection program 2012 of the broadband access server B1 deletes the PPPoE session ID 20151 of the user H3 and the corresponding PPP user ID 20152 from the PPPoE session management table 2015 (SQ4-7; S4005 in FIG. 15).

In the sequence SQ1 shown in FIG. 7, the sequence SQ2 shown in FIG. 11, and the sequence SQ3 shown in FIG. 12, the multicast distribution program 2013 of the broadband access server B1 sends a Multicast Membership Query message confirming a multicast user connection in order to check whether the multicast user is interfaced. If the user is not interfaced, the multicast route information indicating the replication and transfer destination of the multicast packet such as a multicast group address and PPPoE session ID is deleted from the multicast group management table 2017.

The broadband access server B1 has the multicast counter 2014 for counting the number of distributed multicast packets and the number of distributed bytes, for each multicast group address.

FIG. 16A and FIG. 16B show the configuration of the multicast counter 2014. The broadband access server B1 has the multicast counter for each multicast group address. The multicast counter 2014 contains the number of distributed multicast bytes 20142 and the number of distributed multicast packets 20143 in correspondence with a multicast group address 20141. The values of the multicast counter 2014 continue increasing in accordance with the number of distributed multicast packets and the number of distributed multicast bytes in multicast distribution as shown in FIG. 16A and FIG. 16B.

When a Multicast Membership Report Join message is received from a first user of a multicast group, the multicast distribution program 2013 of the broadband access server B1 activates the multicast counter 2014 at the multicast group address. If no terminal belongs to a multicast group, the counting of either or both of the number of bytes and the number of packets of the multicast group starts when a Multicast Membership Report Join message containing the corresponding multicast group address is received. When a Leave Group message is received from the last user of the multicast group, the multicast distribution program 2013 stops the counting by the multicast counter 2014. If no terminal remains in a multicast group after the last terminal leaves the multicast group (by sending a Leave Group message, for instance), the counting of either or both of the number of bytes and the number of packets of the multicast group stops. Whether a user belongs to a multicast group can be determined by checking whether the PPP user management table 2016 contains a multicast session ID corresponding to the multicast group address.

If no user remains in a multicast group, the counting need not be actively started or stopped in a system where a content server does not distribute multicast packets to a broadband access server B1. The counter values are not incremented.

When a usage-based accounting of the user H3 is provided, the broadband access server B1 sends the multicast session ID "user3@isp1.sub.—4#224.30.30.30" and the values of the multicast counter 2014 at the timings when the user H3 joins and leaves the group, to the multicast accounting radius server AC2.

The multicast counter 2014 can count the number of bytes and the number of packets of each multicast group address, by counting the number of multicast packets received through an interface or a port to which a content server C1 or C2 corresponding to the multicast group address is connected. The multicast counter 2014 may also count the number of bytes and the number of packets of each multicast group address by referencing the multicast group address contained in a received multicast packet.

The broadband access server B1 receives a Multicast Membership Report Join message from a user and obtains a PPPoE session ID from the header of the PPPoE session where the Join message is received. The multicast distribution program 2013 obtains a PPP user ID concerning the PPPoE session ID from the PPPoE session management table 2015. The broadband access server B1 selects the multicast counter 2014 corresponding to the multicast group address of the user obtained from the Join packet. The broadband access server B1 generates a multicast session ID from the PPP user ID and the multicast group address.

Figure 17:
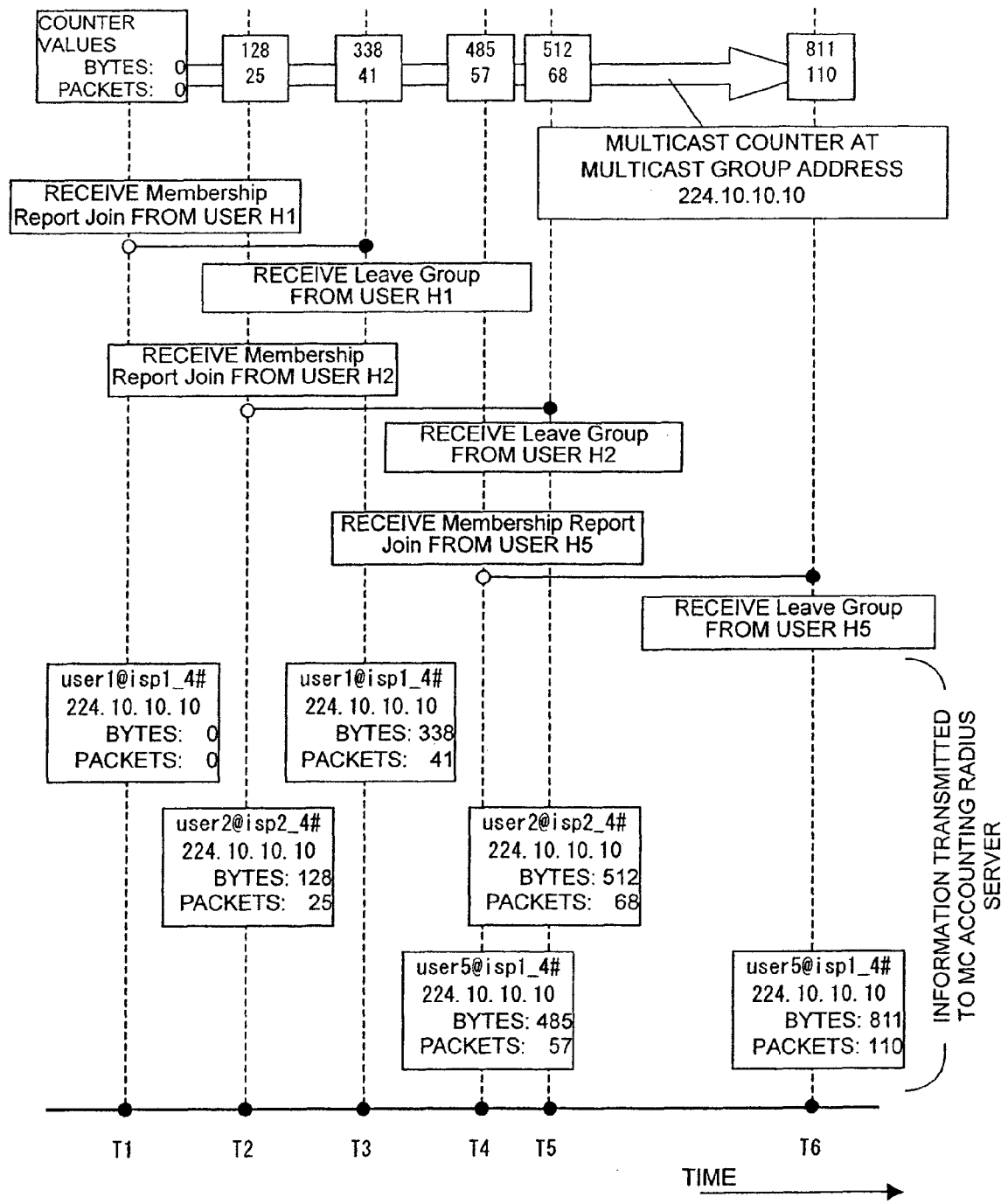
FIG. 17 shows the operation sequence of the multicast counter of the present invention.

FIG. 17 shows the operation sequence of the multicast counter at multicast group address "224.10.10.10". The multicast distribution program 2013 starts the multicast counter 2014 at a time T1 when a Multicast Membership Report Join message is received from the user H1 while the broadband access server B1 has no users viewing or listening to a multicast program at address "224.10.10.10". The byte count and the packet count start from zero in FIG. 17, but the count may start from another value obtained at the end of the preceding operation.

The broadband access server B1 specifies the byte count "0" and the packet count "0" of the multicast counter values at the time T1 and the multicast session ID "user1@isp1.sub.—4#224.10.10.10" of the user H1 in an attribute 500, which will be described later, of a Multicast Accounting-Request Start message, and sends the message to the multicast accounting radius server AC1.

A Multicast Membership Report Join message is received from the user H2 at a time T2. The broadband access server B1 specifies the byte count "128" and the packet count "25" of the multicast counter values at the time T2 and the multicast session ID "user2@isp2.sub.—4#224.10.10.10" of the user H2 in the attribute 500, which will be described later, of a Multicast Accounting-Request Start message, and sends the message to the multicast accounting radius server AC1.

A Leave Group message is received from the user H1 at a time T3. The broadband access server B1 specifies a byte count "338" and a packet count "41" of the multicast counter values at the time T3 and the multicast session ID "user1@isp1.sub.—4#224.10.10.10" of the user H1 in the attribute 500, which will be described later, of a Multicast Accounting-Request Stop message, and sends the message to the multicast radius server. A similar operation is conducted at times T4, T5, and T6.

When the broadband access server receives Leave Group from the user H5, the user H5 leaves the multicast group, and no user remains interfaced for multicast distribution. So, the multicast distribution program 2013 stops the multicast counter 2014 at the time T6 when a Leave Group message is received from the user H5.

The multicast accounting radius server AC1 stores the received multicast session ID, byte count, packet count, and accounting status of "start" or "stop" in correspondence with one another in the usage-based multicast accounting table 6000. FIG. 20 shows an example of the usage-based multicast accounting table 6000. The multicast accounting radius server AC1 calculates the listening-or-viewing period of each multicast session ID, by subtracting the reception time of the Multicast Accounting-Request Start message from the reception time of the Multicast Accounting-Request Stop message corresponding to the multicast session ID. The multicast accounting radius server AC1 also calculates the number of distributed bytes or the number of distributed packets of each multicast session ID, by subtracting the counter value when a Membership Report Join message is sent (the byte count or the packet count in the entry where the accounting status is "start") from the counter value when a Leave Group message is sent (the byte count or the packet count in the entry where the accounting status is "stop"). The multicast accounting radius server AC1 may further calculate a bit rate or others by dividing the calculated byte count or packet count by the calculated listening-or-viewing period.

The packets and bytes distributed to the user H2 in FIG. 17 are calculated as follows: The packet count "68" at the time T5 minus the packet count "25" at the time T2 is "43"; The byte count "512" at the time T5 minus the byte count "128" at the time T2 is "384".

FIG. 18 shows the format of a multicast radius accounting packet exchanged between the broadband access server B1 and the multicast accounting radius servers AC1 and AC2. The multicast radius accounting packet includes an attribute 500, where accounting generation information such as a byte count, a packet count, and a multicast session ID is accumulated.

FIG. 19 shows the attribute 500 used in usage-based accounting of multicasting. The attribute 500 includes acct-session-id 5001, which is a unique value assigned to each accounting session. The attribute 500 contains strings expressing a type, a length, and a status. In usage-based accounting of multicasting, the string of acct-session-id 5001 is a combination of a PPP user ID, a V4-or-V6 descriptor, and a multicast group address (multicast session ID), and this string expresses a unique value for each user and each multicast program. The acct-session-id string 5001 of the user H3 is as follows:

user3@isp1.sub.—4#224.30.30.30 Another example of the acct-session-id string 5001 for IPv6 multicasting is:

user7@isp4.sub.—6#ff00::11

In the attribute 500, an acct-input-octets string 5002 specifies the number of distributed bytes, and an acct-input-packets string 5003 specifies the number of distributed packets. The number of times the counter of acct-input-octets 5002 is reset from the maximum count of $2.sup.32$ is specified in an acct-input-gigawords string 5004. An acct-status-type string 5005 is "start", which expresses the start of multicast distribution to the user, or "stop", which expresses the end of multicast distribution.

In the broadband access server B1, the multicast distribution program 2013 references the values of the multicast counter 2014 in accordance with the multicast address; and the radius communication processing program 2011 accumulates accounting generation information indicating the number of distributed bytes and the number of distributed packets corresponding to the multicast address in the attribute 500, and sends the multicast radius accounting packet to the multicast accounting radius server AC1 or AC2. The multicast accounting radius server AC1 or AC2 totalizes and stores the accounting generation information, performs usage-based accounting of each multicast session ID in accordance with the size of distributed data such as the number of distributed packets and the number of distributed bytes, and manages the accounting generation information collectively.

The multicast accounting radius servers AC1 and AC2 can provide a usage-based accounting in accordance with either or both of the number of bytes and the number of packets. A usage-based accounting in accordance with the bit rate can also be provided. Different accounting rates can be specified for individual multicast group addresses.

For instance, the accounting server obtains the byte count and packet count contained in a message requesting the stop of multicast accounting of each multicast session identifier and the byte count and packet count contained in a message requesting the start of multicast accounting, and charges each user and each multicast group by either or both of the number of bytes and the number of packets distributed from when the user joins the multicast group until when the user leaves the multicast group or by the bit rate depending on either or both of the number of distributed bytes and the number of distributed packets.

2. Second Embodiment

In the first embodiment, the broadband access server B1 collects and sends accounting generation information indicating the number of distributed bytes and the number of distributed packets to a multicast accounting radius server AC1 or AC2, which totalizes and stores the accounting generation information and provides a usage-based accounting accordingly. In a second embodiment, however, the broadband access server B1 collects and totalizes accounting generation information indicating the number of distributed bytes, the number of distributed packets, and a listening-or-viewing period, and provides a usage-based accounting of multicasting.

The multicast counter 2014 counts the number of bytes and the number of packets of each multicast session ID (each PPP user ID and each PPPoE session ID). The hardware configuration and the table configuration of the broadband access server B1 are the same as those in the first embodiment.

Figure 21:
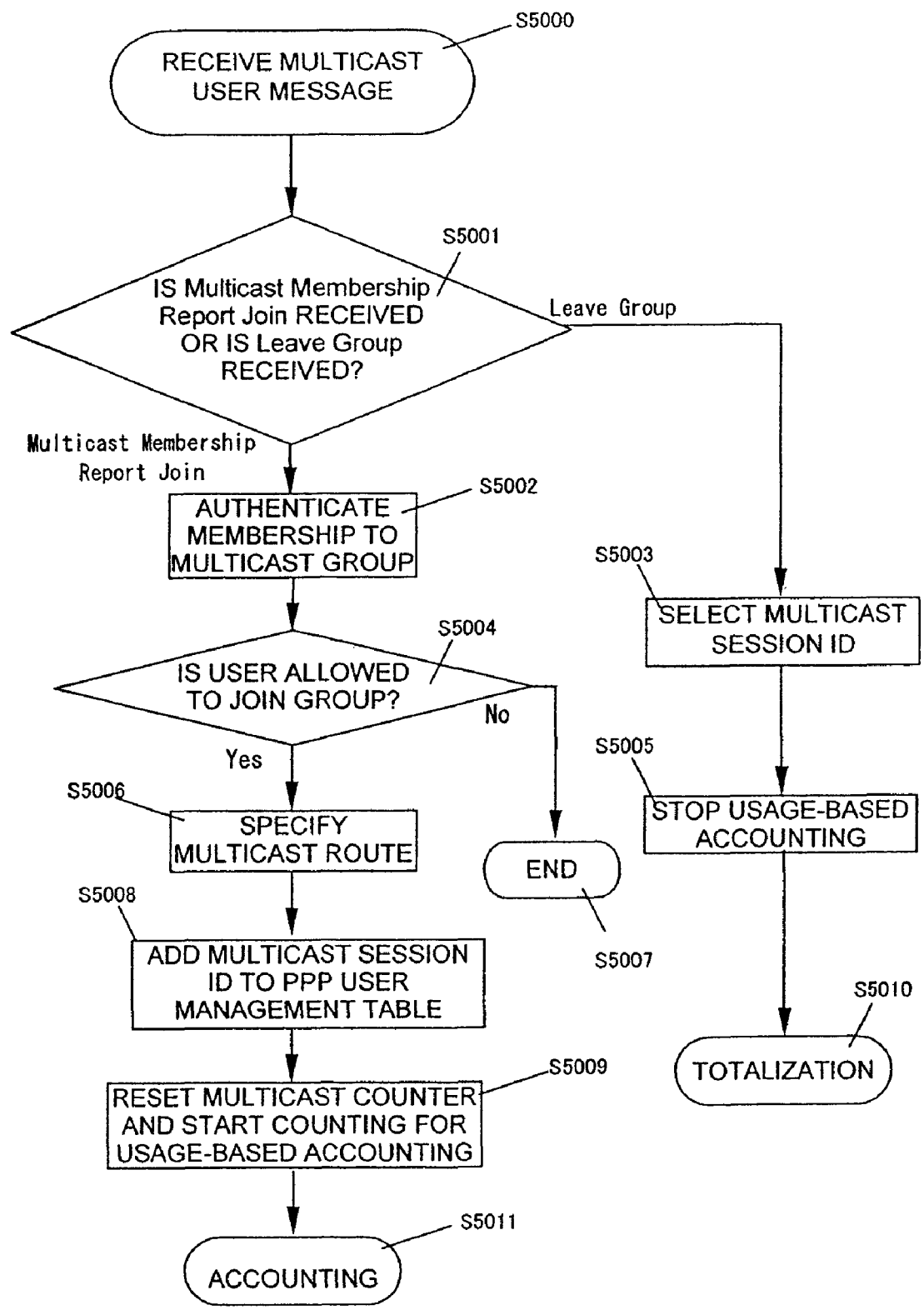
FIG. 21 shows a flow chart of processing of usage-based accounting in a broadband access server of a second embodiment.

FIG. 21 shows a flow chart of the processing of usage-based accounting of multicasting in the broadband access server B1. When a Membership Report Join message requesting membership in a multicast group or a Leave Group message for leaving a group is received from a multicast user H1, H2, or H3 (S5000), the multicast distribution program 2013 of the broadband access server B1 identifies which message is received from the user, Membership Report Join or Leave Group (S5001).

If the broadband access server B1 receives a Membership Report Join message from a user H1, H2, or H3 (S5001), the multicast distribution program 2013 authenticates the membership of the user in the multicast group (S5002 and S5004) in the same manner as in the first embodiment described earlier. The multicast distribution program 2013 also specifies a multicast route indicating the replication and transfer destination of a multicast packet, in the multicast group management table 2017 (S5006).

The multicast distribution program 2013 of the broadband access server B1 then generates a multicast session ID 20163 of the user and adds the multicast session ID to the PPP user management table 2016 (S5008). The multicast session ID is generated in the same way as described in the first embodiment. The multicast counter 2014 of the second embodiment is stored for each multicast session ID.

When a Multicast Membership Report Join message is received from the user, the multicast distribution program 2013 of the broadband access server B1 resets the values of the multicast counter 2014 to zero, as a preparation for starting a usage-based accounting of each user, and starts the multicast counter 2014 (S5009). When a Leave Group message is received from the user, the multicast distribution program 2013 stops the multicast counter 2014.

If a Leave Group message is received from a user H1, H2, or H3 (S5001), the broadband access server B1 selects a multicast session ID (S5003). The multicast distribution program 2013 of the broadband access server B1 stops the multicast counter 2014 and obtains the counter values (S5005). The broadband access server B1 also totalizes accounting generation information indicating the number of distributed bytes and the number of distributed packets of each multicast session ID, in accordance with the counter values (S5010). The multicast session ID is selected in the same manner as described earlier.

The broadband access server B1 calculates the listening-or-viewing period of each multicast session ID, by subtracting the reception time of the Multicast Membership Report Join message from the reception time of the Leave Group message of the user. A rate may also be obtained by dividing the number of packets or the number of bytes by the listening-or-viewing period. A bit rate may further be obtained by dividing the number of data bits depending on the number of bytes by the listening-or-viewing period. The broadband access server B1 calculates a listening-or-viewing charge on the basis of the byte count, packet count, bit rate, and others. After a usage-based accounting is provided, the broadband access server B1 sends the listening-or-viewing charge of each multicast session ID to the multicast accounting radius server AC1 or AC2, and presents the charge to the corresponding content distribution operator.

The fact that a terminal has left a multicast group is detected by receiving a Leave Group message in the example described above. The fact of leaving may be detected in other ways as in the first embodiment.

FIG. 22A and FIG. 22B show the configuration of the multicast counter 2014 of the broadband access server B1 of the second embodiment. The multicast counter 2014 stores a byte count and a packet count of each multicast session ID. As shown in FIG. 22A and FIG. 22B, the multicast counter 2014 can store a multicast group address 20141, the number of distributed multicast bytes 20142, the number of distributed multicast packets 20143, and a PPP user ID 20144 in correspondence with one another.

As shown in FIG. 22A and FIG. 22B, the byte count and the packet count of the multicast counter 2014 continue increasing as the number of distributed packets increases in multicast distribution.

The usage-based accounting of the second embodiment is performed just by the broadband access server B1, so that the broadband access server B1 requires the multicast counter 2014 of each multicast session ID.

3. Third Embodiment

Figure 23:
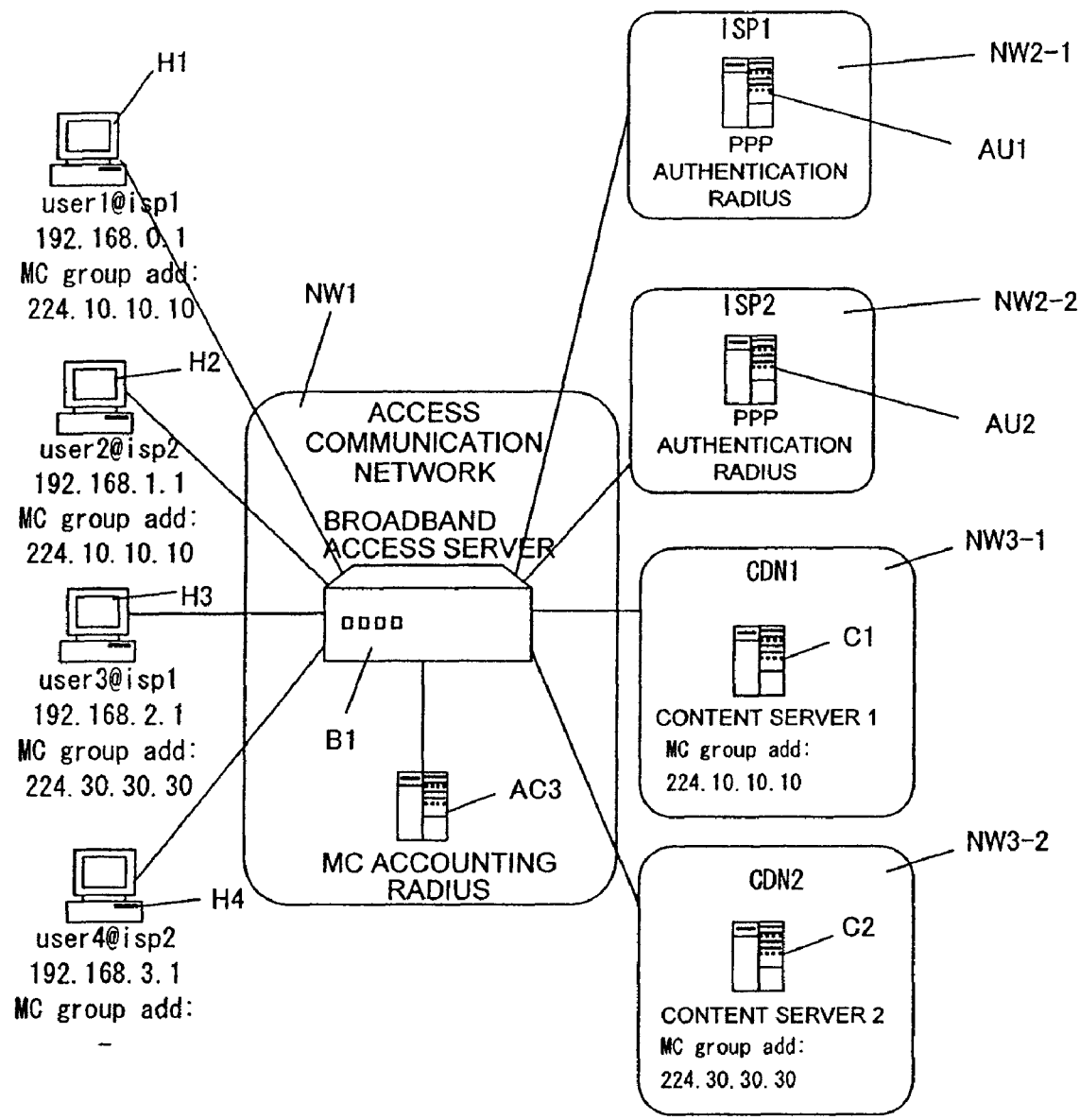
FIG. 23 shows the configuration of a communications system of the third embodiment.

FIG. 23 shows a network configuration of a third embodiment. In the first embodiment, the multicast accounting radius servers AC1 and AC2 are provided in the CDNs NW3-1 and NW3-2 respectively. In the third embodiment, a multicast accounting radius server AC3 is provided in an access communication network NW1, and a carrier managing the access communication network offers a proxy accounting service. The other elements shown in FIG. 23 are the same as those in the first embodiment shown in FIG. 1.

In the third embodiment, a usage-based accounting of each CDN is provided as in the first embodiment, and the multicast accounting radius server AC3 presents the listening-or-viewing charge of each multicast user to the content distribution operator.

The broadband access server B1 for holding, concentrating, and managing user channels and replicating and transferring multicast packets can totalize and manage the number of users joining a multicast group and the number of users leaving the multicast group in a unit time at each multicast group address and can totalize the audience rating of each multicast program.

FIG. 24 shows the configuration of an audience rating totalization table 2019 of the broadband access server B1. The broadband access server B1 has the audience rating totalization table 2019 at each multicast group address corresponding to a multicast program.

The audience rating totalization table 2019 stores a multicast group address 20191, a predetermined audience rating measurement period (Measurement Time) 20192, the number of users joining the multicast group (Join Users) 20193, the number of users leaving the multicast group (Leave Users) 20194, and the total number of users (Total Users) 20195, and the number of users taken over to the next measurement period (Continuation Users) 20196, in correspondence with one another. The Join Users value may be the number of Join messages received, and the Leave Users value may be the number of Leave messages received, for instance. The broadband access server B1 obtains the numbers of terminals joining and leaving a multicast group in predetermined time slots and stores the values at each multicast group address on a time slot basis, for instance.

The Total Users value 20195 and the Continuation Users value 20196 can be calculated as follows: (Total Users 20195) =(Join Users 20193 of [n])+Continuation Users 20196 of [n−1]) (Continuation Users 20196 of [n])=(Total Users 20195)−(Leave Users 20194) where n indicates a time slot, and n−1 indicates a preceding time slot. In FIG. 24, the Total Users value "35" of a time slot from 14:00 to 14:59 is obtained by adding the Join Users value "10" of the same time slot and the Continuation Users value "25" of the preceding time slot from 13:00 to 13:59. The continuation Users value "20" of the same time slot is obtained by subtracting the Leave Users value "15" from the Total Users value "35" of the same time slot. The broadband access server B1 stores the total number of users and the number of continuation user terminals at each multicast group address on a predetermined time slot basis. Through the processing described above, the broadband access server B1 obtains an audience rating and the number of viewers and listeners at each multicast group address.

IPv4 multicasting has been described in the first, second, and third embodiments. A usage-based accounting of IPv6 multicasting can be provided in the same procedure.

What is claimed is:

1. A system comprising:
   a first server which replicates a multicast packet from a content server, distributes the replicated packet to terminals, and sends accounting information; and
   a second server which controls an accounting based on the accounting information from the first server,
   wherein the first server comprises:
   a communication processing block for communicating with the second server,
   a packet transfer block for transferring replicated multicast packet to the terminal corresponding to a user identifier, and
   a counter for obtaining the accounting information for each multicast address and each user identifier,
   wherein the second server charges each user identifier in accordance with the accounting information from the first server.

2. A system according to claim 1, wherein the first server further comprises:
   a first user management table for storing the user identifier for each multicast address,
   wherein the counter counts at least one of the number of bytes, the number of packets and distribution time of a distributed content at each multicast address and each user identifier.

3. A system according to claim 2, wherein the communication processing block sends a counting result of the counter to the second server.

4. A system according to claim 1, wherein the first server further comprises:
   a first user management table for storing the user identifier for each multicast address,
   wherein when message requesting membership in a multicast group is received from the terminal,
   wherein the massage contains the user identifier and the multicast address, and
   wherein the first server extracts the user identifier from the message requesting membership in the multicast group to store the user identifier in the first user management table.

5. A system according to claim 4, wherein the counter, after storing the user identifier in the first user management table, stores a counting result which is at least one of the number of bytes, the number of packets and distribution time of a distributed content for each stored user identifier in the first user management table.

6. A system according to claim 5, wherein the communication processing block sends the counting result stored in the first user management table to the second server.

7. A system according to claim 6, wherein the second server further comprises:

a second user management table for storing the user identifier for each multicast address, wherein the second server stores at least one of the number of bytes, the number of packets and distribution time of the distributed content for each multicast address and each user identifier.

8. A system according to claim 1, wherein when the first server detects a fact that the terminal leaves the multicast group or receives message for leaving a multicast group, the first server obtains the user identifier corresponding to the leaved terminal and sends at least one of the number of bytes, the number of packets and distribution time of a distributed content which corresponds to the obtained user identifier.

9. A system according to claim 1, wherein the first server counts, for each user identifier, at least one of the number of bytes, the number of packets and distribution time of a distributed content from when the terminal joins a multicast group until when the terminal leaves the multicast group and generates the accounting information.

10. A system according to claim 1, wherein the second server receives the accounting information from the first server and provides a usage-based accounting for each multicast address and each user identifier.

11. A system according to claim 1, wherein the second server receives the accounting information from the first server and totalizes an audience rating for each multicast address.

12. A system according to claim 1, wherein the first server further comprises:

an authentication means for authenticating a user corresponding to the terminal, wherein the first server correlates the terminal to the user identifier after authenticating the user.

13. A packet routing apparatus which replicates a multicast packet from a content server, distributes the replicated packet to terminals, and sends accounting information, the packet routing apparatus comprises:

a communication processing block for communicating with an accounting server which controls an accounting based on the accounting information;

a packet transfer block for transferring replicated multicast packet to the terminal corresponding to a user identifier;

a counter for obtaining the accounting information for each multicast address and each user identifier; and a user management table for storing the user identifier for each multicast address, wherein the counter counts at least one of the number of bytes, the number of packets and distribution time of a distributed content at each multicast address and each user identifier, and wherein the accounting server charges each user identifier in accordance with the accounting information from the packet routing apparatus.

14. A packet routing apparatus according to claim 13, wherein the communication processing block sends a counting result of the counter to the accounting server.

15. A packet routing apparatus according to claim 13, wherein when message requesting membership in a multicast group is received from the terminal, wherein the massage contains the user identifier and the multicast address, and wherein the packet routing apparatus extracts the user identifier from the message requesting membership in the multicast group to store the user identifier in the user management table.

16. A packet routing apparatus according to claim 15, wherein the counter, after storing the user identifier in the user management table, stores a counting result which is at least one of the number of bytes, the number of packets and distribution time of the distributed content for each stored user identifier in the user management table.

17. A packet routing apparatus according to claim 16, wherein the communication processing block sends the counting result stored in the user management table to the accounting server.

18. A packet routing apparatus according to claim 13, wherein when the packet routing apparatus detects a fact that the terminal leaves the multicast group or receives message for leaving a multicast group, the packet routing apparatus obtains the user identifier corresponding to the leaved terminal and sends at least one of the number of bytes, the number of packets and distribution time of the distributed content which corresponds to the obtained user identifier.

19. A packet routing apparatus according to claim 13, wherein the packet routing apparatus counts, for each user identifier, at least one of the number of bytes, the number of packets and distribution time of the distributed content from when the terminal joins a multicast group until when the terminal leaves the multicast group and generates the accounting information.

20. A packet routing apparatus according to claim 13, further comprises:

an authentication means for authenticating a user corresponding to the terminal, wherein the packet routing apparatus correlates the terminal to the user identifier after authenticating the user.

* * * * *